(12) United States Patent
Ushinohama

(10) Patent No.: US 11,778,110 B2
(45) Date of Patent: Oct. 3, 2023

(54) IMAGE PROCESSING APPARATUS DISPLAYING A HOME SCREEN IN A FIXED BUTTON MODE IN A STATE WHERE ACQUISITION OF A RECOMMENDED BUTTON INFORMATION IS UNAVAILABLE

(71) Applicant: CANON KABUSHIKI KAISHA, Tokyo (JP)

(72) Inventor: Takuya Ushinohama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/917,350

(22) Filed: Jun. 30, 2020

(65) Prior Publication Data
US 2021/0006677 A1   Jan. 7, 2021

(30) Foreign Application Priority Data
Jul. 3, 2019 (JP) ................................ 2019-124613

(51) Int. Cl.
*H04N 1/00* (2006.01)

(52) U.S. Cl.
CPC ....... *H04N 1/00474* (2013.01); *H04N 1/0048* (2013.01); *H04N 1/00214* (2013.01); *H04N 1/00514* (2013.01)

(58) Field of Classification Search
None
See application file for complete search history.

(56) References Cited

U.S. PATENT DOCUMENTS

| | | | | |
|---|---|---|---|---|
| 2005/0156879 A1* | 7/2005 | Honda | .............. | H04M 1/72472 345/156 |
| 2007/0152980 A1* | 7/2007 | Kocienda | .............. | G06F 3/0236 345/173 |
| 2010/0095227 A1* | 4/2010 | Park | .............. | G06F 3/0482 715/810 |
| 2012/0194826 A1* | 8/2012 | Kunori | .............. | G06F 16/957 358/1.15 |

(Continued)

FOREIGN PATENT DOCUMENTS

| JP | 2003076637 A | 3/2003 |
|---|---|---|
| JP | 2009181376 A | 8/2009 |
| JP | 2011119939 A | 6/2011 |

*Primary Examiner* — Miya J Williams
*Assistant Examiner* — Pawan Dhingra
(74) *Attorney, Agent, or Firm* — Canon U.S.A., Inc. IP Division

(57) ABSTRACT

An image processing apparatus communicable with an information processing apparatus includes a display and one or multiple processors configured to transmit a request for information and arrangement of buttons to be displayed on the display to the information processing apparatus; to receive the information and the arrangement of the plurality of buttons, transmitted by the information processing apparatus in accordance with the transmitted request; to cause the display to display the buttons in accordance with the received information and the received arrangement of the buttons; to cause, when at least one of the information and the arrangement of the buttons is not received, the display to display a screen based on information and arrangement of buttons stored in the image processing apparatus before the acquisition request is transmitted.

4 Claims, 19 Drawing Sheets

(56) References Cited

U.S. PATENT DOCUMENTS

| | | | |
|---|---|---|---|
| 2014/0368875 A1* | 12/2014 | Sato | H04N 1/00474 358/1.15 |
| 2015/0146242 A1* | 5/2015 | Tsujimoto | H04N 1/00408 358/1.15 |
| 2015/0268894 A1* | 9/2015 | Saito | G06F 3/1206 358/1.16 |
| 2016/0080594 A1* | 3/2016 | Kuroda | H04N 1/00464 358/1.15 |

* cited by examiner

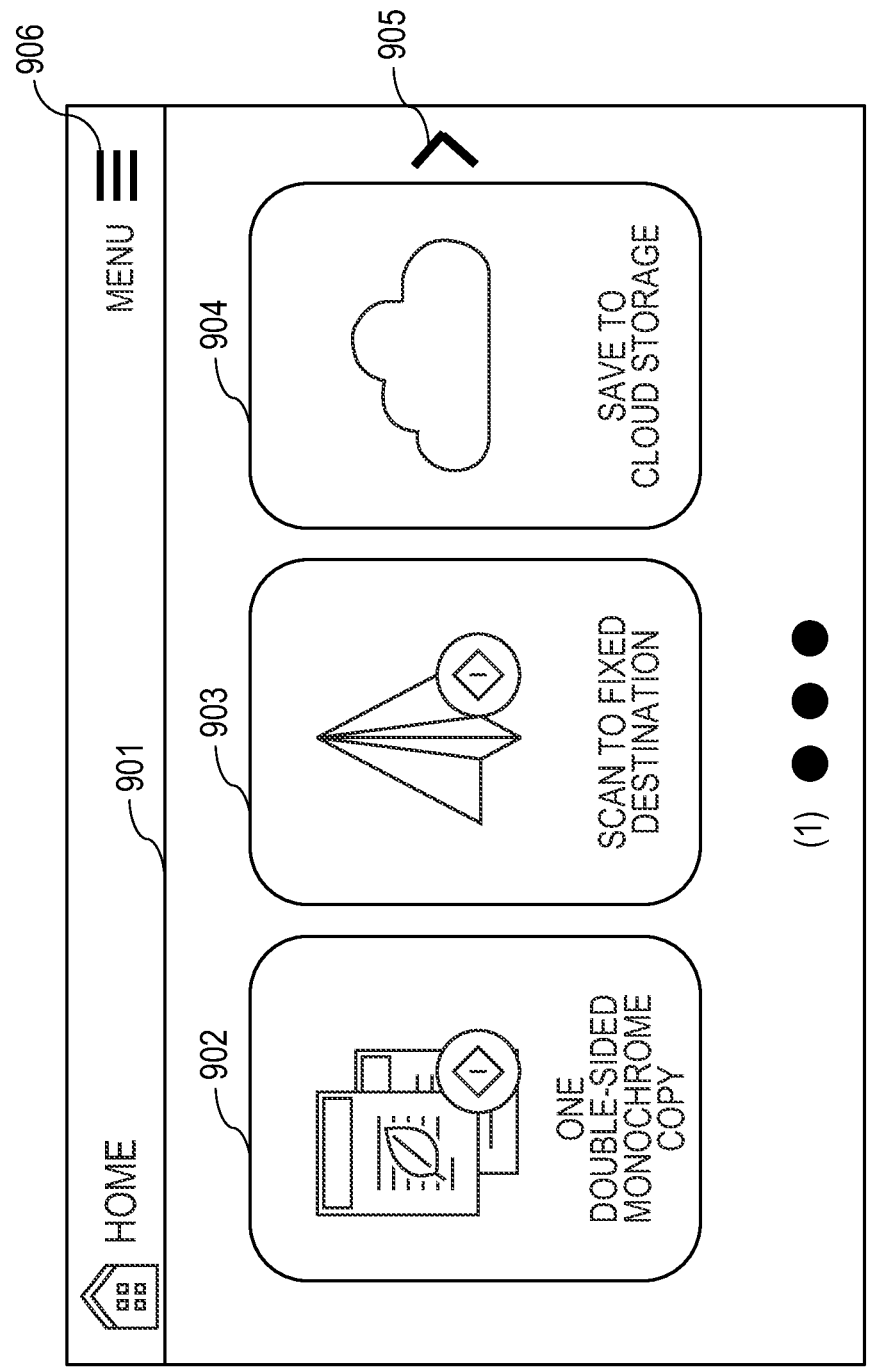

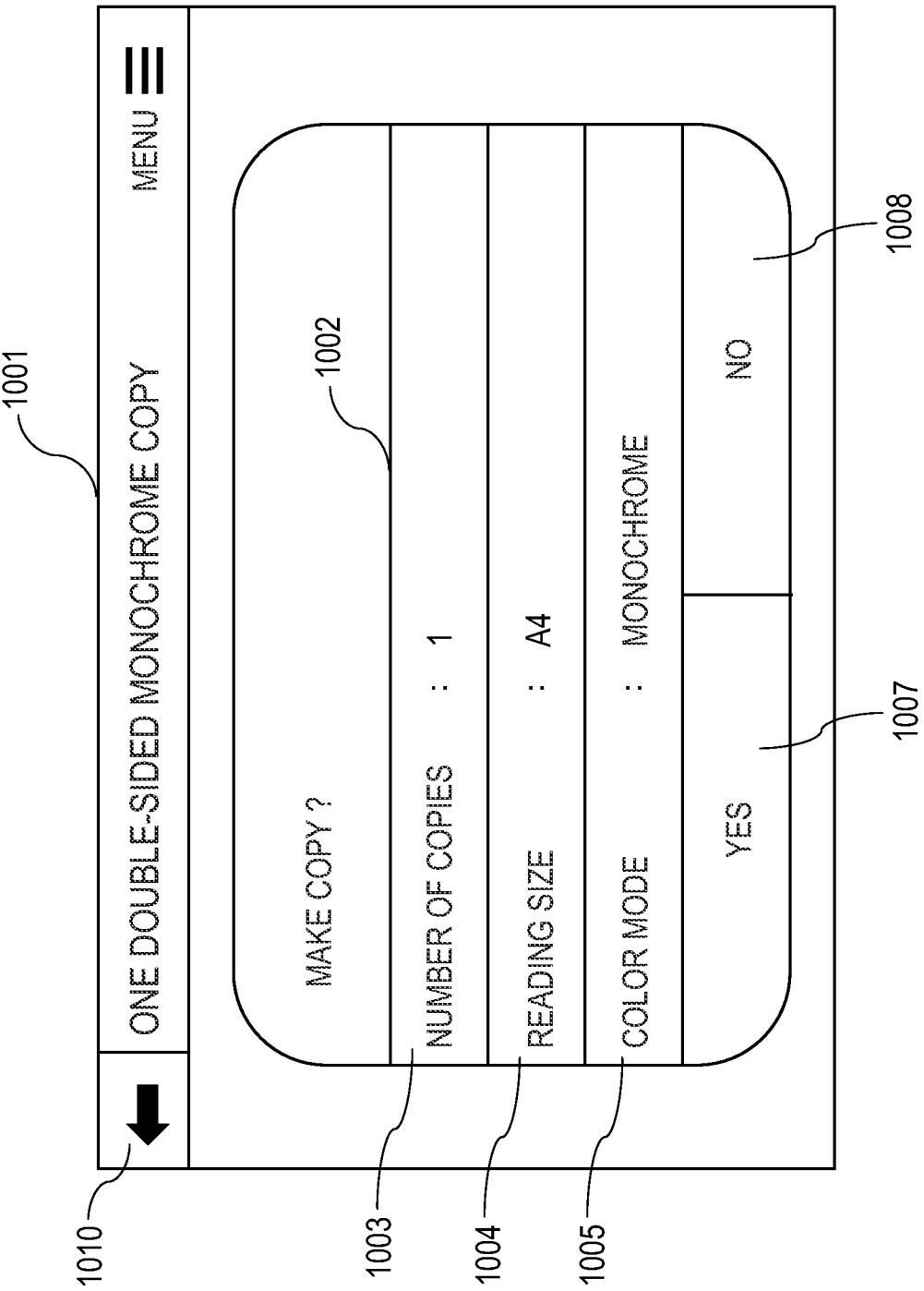

FIG. 10

| TARGET TO BE RECOMMENDED | JOB TYPE | JOB SETTINGS | DISPLAY PRIORITY | BUTTON NAME | BUTTON IMAGE |
|---|---|---|---|---|---|
| user001 | scan (COPY) | NUMBER OF COPIES: 1 COLOR MODE: MONOCHROME SINGLE/DOUBLE: DOUBLE AGGREGATION: 2in1 | scan:1 print:2 | ONE DOUBLE-SIDED MONOCHROME COPY | rec_home_bt_copy.png |
| user001 | scan (TRANSMIT BY E-MAIL) | DESTINATION: abc@mail.co.jp COLOR MODE: COLOR READING SIZE: A4 READING SIDE: SINGLE | scan:2 print:5 | SCAN TO FIXED DESTINATION | rec_home_bt_scan.png |
| user001 | scan (SAVE IN FILE) | DESTINATION: XXX COLOR MODE: COLOR READING SIZE: A4 READING SIDE: SINGLE | scan:3 print:4 | SAVE TO CLOUD STORAGE | rec_home_bt_cloud.png |
| user001 | scan (COPY) | NUMBER OF COPIES: 5 COLOR MODE: COLOR SINGLE/DOUBLE: SINGLE | scan:4 print:3 | FIVE COLOR COPIES | rec_home_bt_copy.png |
| user001 | print | NUMBER OF COPIES: 1 COLOR MODE: MONOCHROME AGGREGATION: 2in1 | scan:5 print:1 | ONE MONOCHROME COPY | rec_home_bt_copy.png |
| MFP101 | scan (COPY) | NUMBER OF COPIES: 1 COLOR MODE: COLOR SINGLE/DOUBLE: SINGLE | scan:1 print:4 | ONE COLOR COPY | rec_home_bt_copy.png |
| MFP101 | print | NUMBER OF COPIES: 1 COLOR MODE: COLOR AGGREGATION: 2in1 | scan:3 print:1 | ONE COLOR 2in1 COPY | rec_home_bt_copy.png |

FIG. 11

| BUTTON NAME | BUTTON IMAGE | ORDER OF DISPLAY | TRANSITION DESTINATION SCREEN |
|---|---|---|---|
| COPY | home_bt_copy.png | 1 | COPY SETTINGS SCREEN |
| SCAN | home_bt_scan.png | 2 | SCAN TYPE SETTINGS SCREEN |
| ADDRESS BOOK | home_bt_address.png | 3 | ADDRESS BOOK LIST SCREEN |
| MEMORY MEDIA PRINT | home_bt_memorymediaprint.png | 4 | MEMORY MEDIA LIST SCREEN |
| ... | ... | ... | ... |

FIG. 12

| TARGET TO BE RECOMMENDED | JOB TYPE | JOB SETTINGS | DISPLAY PRIORITY | BUTTON NAME | BUTTON IMAGE |
|---|---|---|---|---|---|
| user001 | scan (COPY) | NUMBER OF COPIES: 1 COLOR MODE: MONOCHROME SINGLE/DOUBLE: DOUBLE AGGREGATION: 2in1 | scan:1 print:2 | ONE DOUBLE-SIDED MONOCHROME COPY | rec_home_bt_copy.png |
| user001 | scan (COPY) | NUMBER OF COPIES: 5 COLOR MODE: COLOR SINGLE/DOUBLE: SINGLE | scan:4 print:3 | FIVE COLOR COPIES | rec_home_bt_copy.png |
| user001 | scan (TRANSMIT BY E-MAIL) | DESTINATION: abc@mail.co.jp COLOR MODE: COLOR READING SIZE: A4 READING SIDE: SINGLE | scan:2 print:5 | SCAN TO FIXED DESTINATION | rec_home_bt_scan.png |
| user001 | scan (SAVE IN FILE) | DESTINATION: XXX COLOR MODE: COLOR READING SIZE: A4 READING SIDE: SINGLE | scan:3 print:4 | SAVE TO CLOUD STORAGE | rec_home_bt_cloud.png |
| user001 | print | NUMBER OF COPIES: 1 COLOR MODE: MONOCHROME AGGREGATION: 2in1 | scan:5 print:1 | ONE MONOCHROME COPY | rec_home_bt_print.png |
| MFP101 | scan (COPY) | NUMBER OF COPIES: 1 COLOR MODE: COLOR SINGLE/DOUBLE: SINGLE | scan:1 print:4 | ONE COLOR COPY | rec_home_bt_copy.png |
| MFP101 | print | NUMBER OF COPIES: 1 COLOR MODE: COLOR AGGREGATION: 2in1 | scan:3 print:1 | ONE COLOR COPY | rec_home_bt_print.png |
| user002 | scan (COPY) | NUMBER OF COPIES: 1 COLOR MODE: COLOR AGGREGATION: 2in1 | scan:1 print:3 | ONE COLOR COPY | rec_home_bt_copy.png |
| ... | | | | | |

FIG. 13

```
{
   "buttons" : [
      {
         "name" : "ONE DOUBLE-SIDE MONOCHROME COPY",
         "type" : "scan",
         "icon" : "rec_home_bt_copy.png",
         "order" : {
            "scan" : 1,
            "print" : 2
         },
         "parameters" : {
            "NUMBER OF COPIES" : "1",
            "SINGLE/DOUBLE" : "DOUBLE",
            "COLOR MODE" : "MONOCHROME",
            "AGGREGATION" : "2in1"
         }
      },
      {
         "name" : "SCAN TO FIXED DESTINATION",
         "type" : "scan",
         "icon" : "rec_home_bt_scan.png",
         "order" : {
            "scan" : 2,
            "print" : 5
         },
         "parameters" : {
            "DESTINATION" : "abc@mail.co.jp",
            "COLOR MODE" : "COLOR",
            "READING SIZE" : "A4",
            "READING SIDE" : "SINGLE"
         }
      },
   ]
}
```

IMAGE PROCESSING APPARATUS DISPLAYING A HOME SCREEN IN A FIXED BUTTON MODE IN A STATE WHERE ACQUISITION OF A RECOMMENDED BUTTON INFORMATION IS UNAVAILABLE

BACKGROUND OF THE INVENTION

Field of the Invention

The present disclosure relates to an image processing apparatus, a control method for an image processing apparatus, and an image processing system.

Description of the Related Art

In image processing apparatuses having a plurality of functions, such as print, copy, and fax, buttons respectively associated with the functions are displayed on a home screen, and users select a function to be used from among the buttons displayed, with the result that a settings screen for the function is displayed.

In Japanese Patent Laid-Open No. 2003-076637, the names and images of buttons to be displayed on a menu screen and the operations when the buttons are selected are registered in advance in a server with the use of a PC. When a user accesses the server from a terminal that the user uses, such as a cellular phone, and issues a menu acquisition request, menu buttons registered in the server are transmitted to the terminal, such as a cellular phone. The terminal, such as a cellular phone, displays the menu buttons by using information acquired from the server. The user is able to use a desired function by selecting a button associated with an intended function from among the displayed menu buttons.

However, in Japanese Patent Laid-Open No. 2003-076637, when the terminal fails to acquire information on the buttons from the server because of some trouble in a network or the like, the user is not able to select a function to use if no image for selecting a function is displayed on the home screen.

SUMMARY OF THE INVENTION

According to embodiments of the present disclosure, an image processing apparatus communicable with an information processing apparatus includes a display and one or multiple processors. The one or multiple processors are configured to operate as: a transmission unit configured to transmit an acquisition request for information of a plurality of buttons to be displayed on the display and arrangement of the plurality of buttons to the information processing apparatus; a receiving unit configured to receive the information of the plurality of buttons and the arrangement of the plurality of buttons, transmitted by the information processing apparatus in accordance with the transmitted acquisition request; and a control unit configured to cause the display to display the plurality of buttons based on the received information of the plurality of buttons and the received arrangement of the plurality of buttons. The control unit is configured to, when at least one of the information of the plurality of buttons and the arrangement of the plurality of buttons is not received, cause the display to display a screen based on information of a plurality of buttons and arrangement of the plurality of buttons, stored in the image processing apparatus before the acquisition request is transmitted.

Further features of the present disclosure will become apparent from the following description of exemplary embodiments with reference to the attached drawings.

BRIEF DESCRIPTION OF THE DRAWINGS

FIG. 8 is a view showing an example of a home screen that is displayed in a recommend mode.
FIG. 9 is a view showing an example of a screen that is displayed when "ONE MONOCHROME COPY" is selected in the recommend mode.
FIG. 10 is a view showing a recommend button information table stored in the MFP.
FIG. 11 is a view showing a fixed button information table stored in the MFP.
FIG. 12 is a view showing a recommend button information table stored in the recommend button management server.
FIG. 13 is a view showing an example of recommend button information that the MFP receives in embodiments.

DESCRIPTION OF THE EMBODIMENTS

Hereinafter, embodiments of the present disclosure will be described in detail with reference to the attached drawings.

In the present embodiments, for example, a multifunction peripheral (hereinafter, referred to as MFP) having print, scan, and fax functions will be described as an image processing apparatus.

The following embodiments do not limit the invention described in the appended claims. Not all combinations of features that will be described in the embodiments are indispensable for solutions of the invention.

First Embodiment

Figure 1:
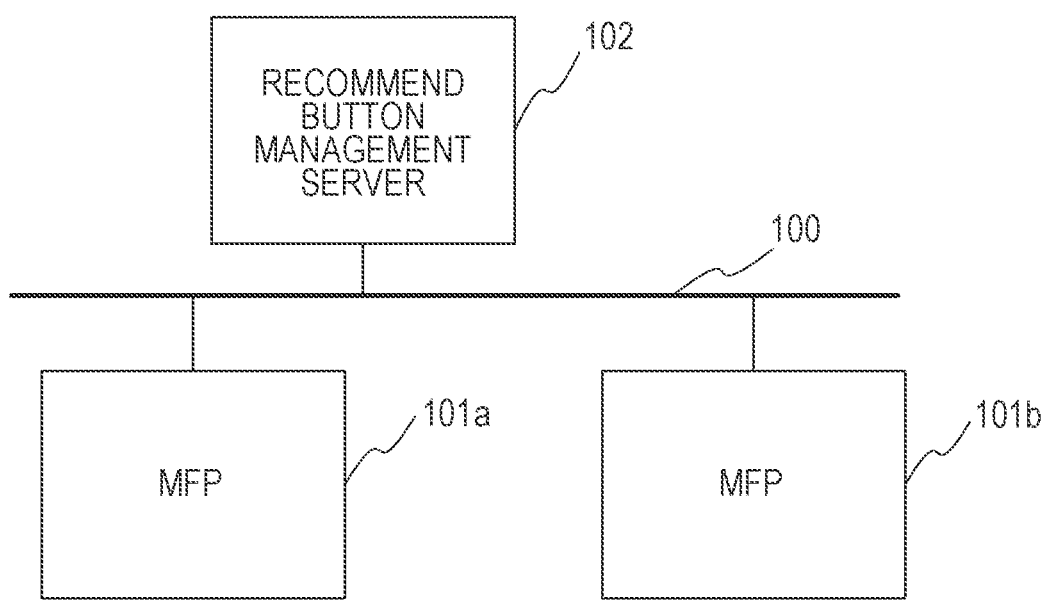
FIG. 1 is an overall configuration diagram of a system.

A first embodiment of the present disclosure will be described. FIG. 1 is a block diagram showing an image processing system according to the present embodiment. An MFP 101a and an MFP 101b function as image processing apparatuses. A recommend button management server 102 functions as an information processing apparatus. The MFP 101a, the MFP 101b, and the recommend button management server 102 are connected via a network 100 to communicate with one another. The MFP 101a and the MFP 101b may be the same models or may be different models.

In the following description, the MFP 101a is regarded as MFP 101.

The recommend button management server 102 has the function of generating button information indicating buttons to be displayed on a home screen of the MFP 101 and to easily call functions that are highly likely to be used by a user (hereinafter, recommend button information) and transmitting the button information to the MFP 101. Whether the recommend button management server 102 is made up of a single server machine or multiple servers is not limited in the present embodiment. The MFP 101 and the recommend button management server 102 may be on the same network.

Figure 2:
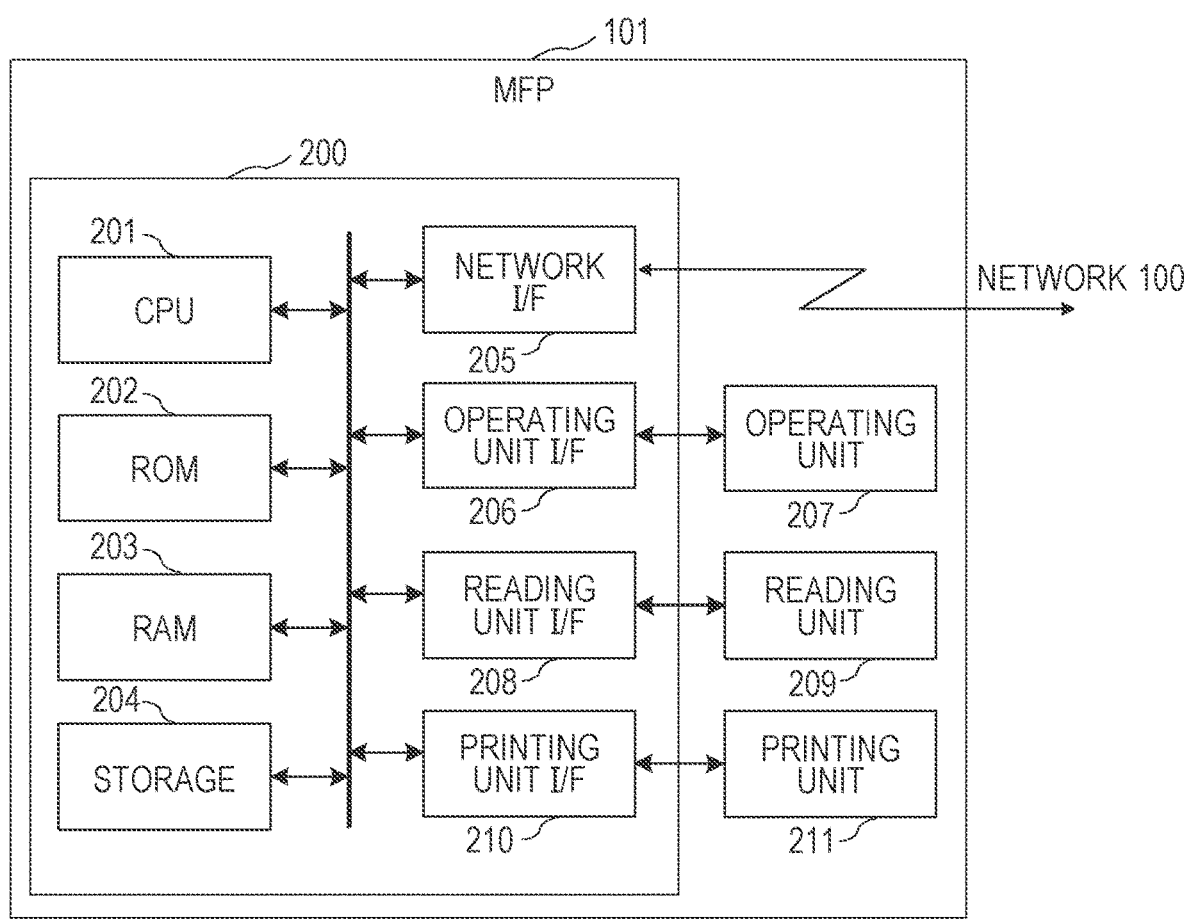
FIG. 2 is a hardware configuration diagram of an MFP.

FIG. 2 is a block diagram showing the hardware configuration of the MFP 101 in the present embodiment. The MFP 101 has a reading function to read an image on a sheet and a printing function to print out an image on a sheet. Other than that, the MFP 101 has, for example, a file transmitting function to transmit image data to an external apparatus.

In the present embodiment, description will be made by using the MFP 101 as an image processing apparatus; however, the image processing apparatus is not limited thereto. For example, a printing apparatus, such as a printer having no reading function, may also be used as the image processing apparatus. Alternatively, an image reading apparatus, such as a scanner having no printing function, or an information processing apparatus, such as a PC, may be used.

A control unit 200 including a central processing unit (CPU) 201 controls overall operations of the MFP 101. The CPU 201 executes various control, such as reading control and printing control, by reading out control programs stored in ROM 202 or storage 204. The ROM 202 stores control programs executable on the CPU 201. RAM 203 is the main memory of the CPU 201 and is used as a temporary storage area for expanding various control programs stored in a work area, the ROM 202, and the storage 204. The storage 204 stores print data, image data, various programs, and various setting information. In the MFP 101 of the present embodiment, it is assumed that the single CPU 201 executes processes shown in flowcharts (described later) by using the single memory (RAM 203); however, the MFP 101 may be configured in other modes. For example, multiple CPUs, multiple pieces of RAM, multiple pieces of ROM, and multiple pieces of storage may cooperate to execute processes shown in the flowcharts (described later). Alternatively, part of the processes may be executed by using a hardware circuit, such as an application specific integrated circuit (ASIC) and a field-programmable gate array (FPGA).

An operating unit I/F 206 connects the control unit 200 to an operating unit 207. The operating unit 207 includes a display that displays information for a user, and a touch panel or a hard key that detects input from a user.

A reading unit I/F 208 connects the control unit 200 to a reading unit 209. The reading unit 209 generates image data by reading an image on a sheet. Image data generated by the reading unit 209 is transmitted to an external apparatus or used by a printing unit 211 to print out. In addition, the reading unit 209 is capable of reading a sheet placed on an original feeder (not shown) while conveying the sheet one by one.

A printing unit I/F 210 connects the control unit 200 to a printing unit 211. Image data to be printed is transferred to the printing unit 211 via the printing unit I/F 210. The printing unit 211 receives a control command and image data to be printed and prints out an image based on the image data onto a sheet. A printing method of the printing unit 211 may be an electrophotographic method or an inkjet method. In the case of the electrophotographic method, an image is formed by forming an electrostatic latent image on a photosensitive member, then developing the latent image by using toner, transferring the toner image onto a sheet, and fixing the transferred toner image. In the case of the inkjet method, an image is printed onto a sheet by discharging ink. The MFP 101 is also connected to the network 100 via a communication unit IF 205. The communication unit I/F 205 is connected to the recommend button management server 102 on the network 100 such that information communication is possible, and receives recommend button information that is information indicating buttons to be displayed on the home screen of the MFP 101.

Print data received via the communication unit I/F 205 is analyzed by a software module (PDL analysis unit (not shown)) for analyzing print data stored in the storage 204 or the ROM 202. The PDL analysis unit generates data for printing in the printing unit 211 by using print data described in various types of page description languages.

Figure 3:
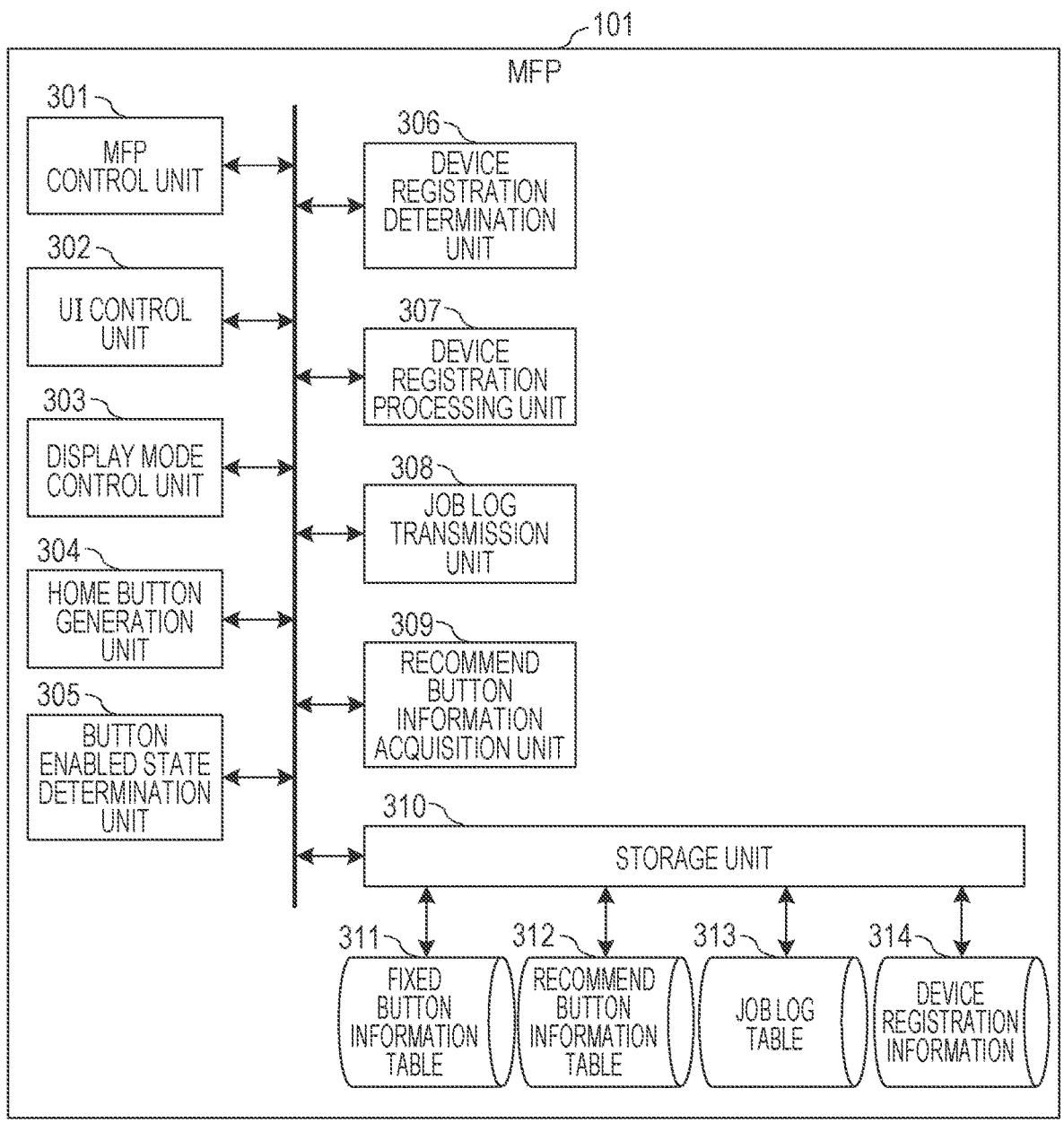
FIG. 3 is a software configuration diagram of the MFP.

FIG. 3 is a block diagram showing the software configuration of the MFP 101 in the present embodiment. Software blocks shown in FIG. 3 each are implemented by the CPU 201 executing a program stored in the ROM 202 or the storage 204.

An MFP control unit 301 controls other modules and generally controls the execution of processes in the MFP, such as scan, transmission, and display processes. The MFP control unit 301 provides an instruction to a storage unit 310 such that the storage unit 310 stores operating logs of the MFP 101 on the execution of jobs, job setting information, and the like, to a job log table (described later).

A UI control unit 302 executes display control over a display of the operating unit 207 via the operating unit I/F 206. Specifically, the UI control unit 302 displays a user notification, various buttons, and the like, on the operating unit 207 and also accepts an operation on the operating unit 207 by a user and then provides details of the operation to other functional units. In the present embodiment, the UI control unit 302 displays a home screen on the operating unit 207. The home screen allows a user to select a function to use. For example, buttons associated with the functions of an image forming apparatus, such as print, copy, and fax, are displayed on the home screen, and a user is able to select any one of the buttons displayed to call a desired function. The home screen is displayed on the operating unit 207 when the power turns on, when a user logs into the MFP 101, or when a user issues an instruction to display the home screen with a home button (not shown). The home screen may be configured to be displayed on the operating unit 207 when a set period of time has elapsed without any operation on the MFP 101 by a user.

A display mode control unit 303 executes control on the display mode of the home screen. The UI control unit 302 operates to display the home screen in the display mode for which the display mode control unit 303 provides an instruction. In the present embodiment, there are the following two display modes, and the home screen is displayed in any one of the display modes.

The first display mode is a fixed button mode in which buttons to be displayed on the home screen are displayed in arrangement set by a user in advance.

Figure 6:
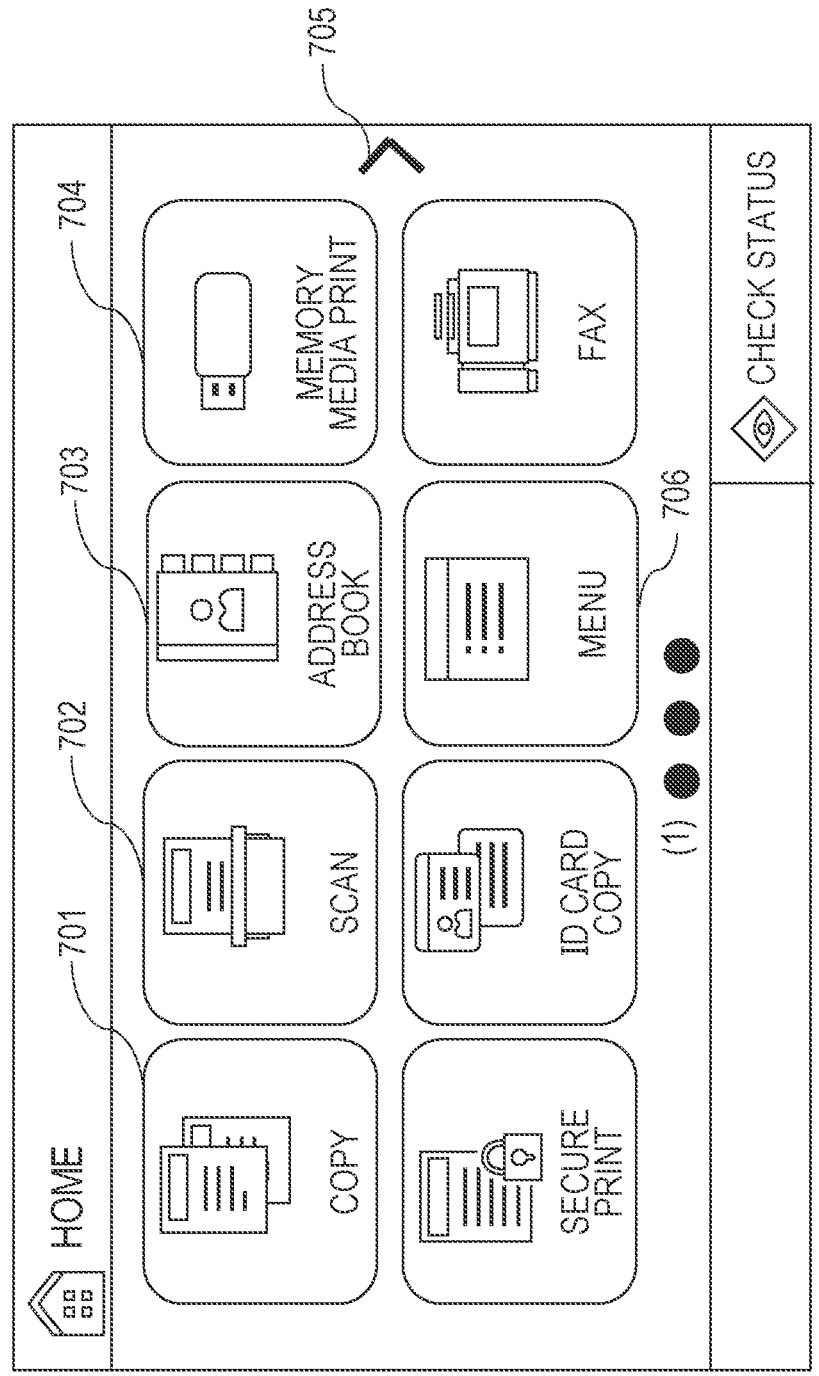
FIG. 6 is a view showing an example of a home screen that is displayed in a fixed button mode.

FIG. 6 is an example of the home screen to be displayed when the fixed button mode is set. In a button display region indicated by 704, buttons such as "COPY" 701, "SCAN" 702, and "FAX" 703 for providing instructions to execute the functions of the MFP 101 are displayed. The button display region 704 includes a plurality of pages. A page displayed may be changed by selecting an arrow button 705 shown in the button display region 704 or flicking on the button display region 704. The home screen is displayed in accordance with a user operation to select the home button (not shown) arranged on the operating unit 207. In the present embodiment, the home button may be a hard key or may be a software key that is displayed on the display.

The "COPY" 701 is a button for reading an original placed in the reading unit 209 as image data and printing an image based on the read image data in the printing unit 211. When a user selects the "COPY" 701 by touching the "COPY" 701 on the home screen, a copy setting screen 801 shown in FIG. 7 is displayed.

The "SCAN" 702 is a button for transmitting an e-mail containing image data read by the reading unit 209, transmitting a file of the image data, or saving the image data in USB memory. When a user selects the "SCAN" 702, a screen for, for example, setting a transmission destination of image data, a resolution at the time of scanning, and a reading side of an original, is displayed.

"ADDRESS BOOK" 703 is a button for displaying an address book screen of the MFP 101. When a user selects the "ADDRESS BOOK" 703, a list of addresses registered in the MFP 101 is displayed. With this screen, a user is able to select an address as a transmission destination of image data, edit an address registered in the address book, or add a new address. When a user designates a transmission destination of an e-mail, a file, or the like, from the address book, the screen transitions into a setting screen on transmission of image data. Destination data of the address book is saved in the storage 204, and settings on destination information to be transmitted are saved for each destination.

Figure 7:
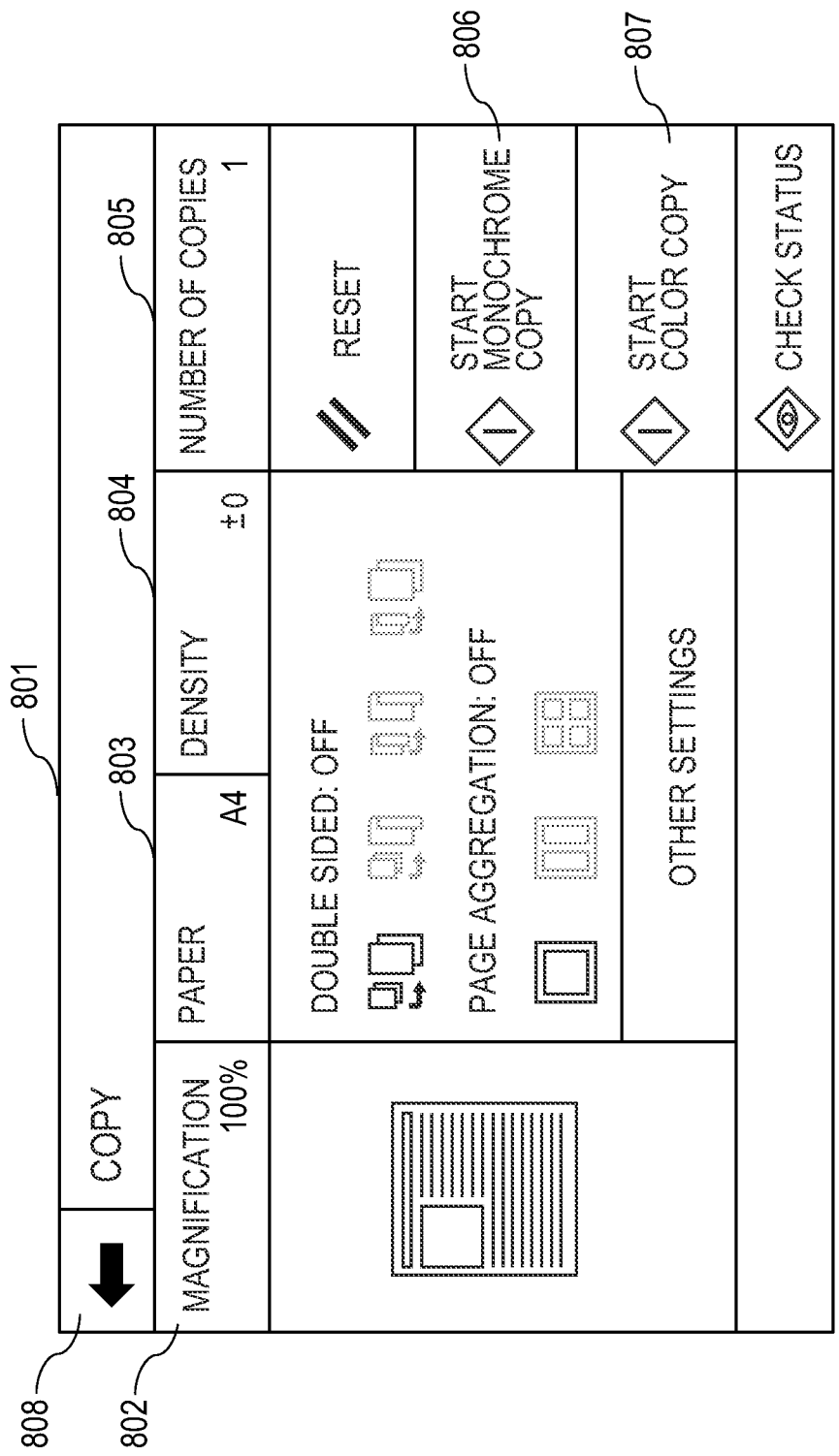
FIG. 7 is a view showing an example of a copy screen that is displayed when a copy button that is displayed in the fixed button mode is selected.

FIG. 7 is a view showing the copy setting screen 801 that is displayed when the copy button 701 in FIG. 6 is selected. With the copy setting screen 801, a user is able to set magnification 802, paper size 803, density 804, number of copies 805, and the like, that are job setting values to be used in copying. A user selects an item for setting from the copy setting screen 801 and inputs and selects a setting value.

A start monochrome copy button 806 and a start color copy button 807 for starting a copy job are also displayed on the copy setting screen 801. After a user sets up any job, the user is able to start the job by selecting any one of the start monochrome copy button 806 and the start color copy button 807. When the user selects the start monochrome copy button 806, the MFP 101 makes a monochrome copy. When the user selects the start color copy button 807, the MFP 101 makes a color copy. A button 808 is a button for cancelling a copy setup and returning to the home screen shown in FIG. 6.

On the home screen of the fixed button mode, buttons are displayed in order set by a user in advance with a method (not shown). Furthermore, when the user selects any one of the buttons displayed on the home screen, a job setting screen for setting the details of a selected function is displayed.

The second display mode is a recommend mode in which recommend buttons are displayed based on user's usage log. In the recommend mode, when the MFP 101 starts up, when a user logs in, or when a user makes a specific operation, a home screen based on button information acquired from the recommend button management server 102 is displayed. For example, recommend buttons are displayed for a user when the user logs in, or recommend buttons on the function of reading an original are preferentially displayed when an original is placed in the reading unit 209. In the recommend mode, buttons to be displayed on the home screen dynamically change based on user's operation or settings of jobs executed in the past.

FIG. 8 is a home screen that is displayed when the recommend mode is set. A predetermined number of buttons is displayed on the home screen based on button information acquired from the recommend button management server 102. On the home screen of the recommend mode, job execution buttons for which setting values of jobs are set in advance are displayed. When a user selects a recommend button in a state where setting values are set, the user is able to start a job without setting items to be set on the screen shown in FIG. 7. The number of buttons that can be displayed at a time on the home screen in the recommend mode is less than the number of buttons that can be displayed at a time in the fixed button mode.

In FIG. 8, "ONE DOUBLE-SIDED MONOCHROME COPY" 902, "SCAN TO FIXED DESTINATION" 903, and "SAVE TO CLOUD STORAGE" 904 are displayed as recommend buttons. The "ONE DOUBLE-SIDED MONOCHROME COPY" 902 is a button for executing a copy job to read an original in the reading unit 209 and print out one double-sided monochrome copy of a generated image in the printing unit 211. The "SCAN TO FIXED DESTINATION" 903 is a button for executing a transmission job to read an original in the reading unit 209 and transmit a generated image to a destination set in advance. The "SAVE TO CLOUD STORAGE" 903 is a button for executing a function to read an original in the reading unit 209 and transmit a generated image to a folder on cloud storage. "MENU" 906 is a button similar to a "MENU" 706 on the home screen shown in FIG. 6 and is a button for generally setting the MFP 101. When a user sets the display mode of the home screen, the user selects the "MENU" 906 and selects mode setting of the home screen from setting items displayed. Then, a mode setting screen for selecting the display mode of the home screen from among a plurality of modes including the fixed button mode and the recommend mode is displayed. The user selects the display mode of the home screen from the screen. In FIG. 8, the recommend buttons for any of which setting values are set are displayed. Alternatively, a button for selecting a function, such as 701 to 704 displayed in the fixed button mode of FIG. 6, may be displayed. When a button for selecting a function for which setting values of a job are not set is selected, a screen for displaying setting values of the selected function is displayed as shown in FIG. 7.

Buttons are arranged in a region of a recommend button display region 901 of the home screen. The order of priority is assigned to the recommend buttons by the recommend button management server 102. The MFP 101 arranges buttons in accordance with the order of priority assigned to the buttons. The recommend button display region 901 contains a plurality of pages, buttons over an upper limit number of buttons that can be displayed in one page are displayed in pages by arranging different buttons in the respective pages. A page to be displayed may be changed by selecting an arrow button 905 shown in the recommend button display region 901 or may be changed by flicking on the recommend button display region 901. The number of recommend buttons to be displayed on the home screen of the recommend mode is less than the number of buttons to be displayed on the home screen of the fixed button mode. This configuration makes it easy for a user to select a button from among recommend buttons.

FIG. 9 is a view showing a copy confirmation screen 1001 that is displayed when the "ONE DOUBLE-SIDED MONOCHROME COPY" 902 in FIG. 8 is selected. Setting values of a job associated with the recommend button are displayed in a job setting display region 1002. The number of copies to be made by using the button is displayed in a number of copies display field 1003. A reading size of an original is displayed in a reading size display field 1004. A color mode to read an original is displayed in a color mode display screen 1005. The example of FIG. 9 shows that one copy of image data obtained by reading at A4 size in monochrome mode is printed out. Information not displayed in the job setting display region 1002 can be displayed through scrolling with flicking on the job setting display region 1002. For example, when a user flicks in FIG. 9, the user is able to check setting values for setting of single side or double side for reading an original, setting single side or double side for printing, a reading resolution of an original, and aggregation setting, such as 2in1. When the user selects "YES" 1007, the MFP 101 starts making a copy with the settings displayed in the job setting display region 1002. When the user selects "NO" 1008, the MFP 101 does not make a copy, and the home screen shown in FIG. 9 is displayed. Although not shown in FIG. 9, a reset button for displaying a screen for setting the setting values of a copy job may be displayed on the copy confirmation screen 1001. When the user selects the reset button, the copy screen shown in FIG. 7 to which setting values associated with a recommend button selected by the user are applied is displayed. A user is able to execute a job with setting values different from settings associated with a recommend button by setting the job via the copy screen of FIG. 7. A button 1010 is a button for displaying the home screen shown in FIG. 8 without making a copy.

Description will be made by referring back to FIG. 3. A device registration processing unit 307 executes a process of registering information on the MFP 101 in the recommend button management server 102 (hereinafter, device registration).

Device registration is made when a user sets the display mode of the home screen to the recommend mode from the screen (not shown) or when a user provides an instruction for a device registration process. Changing the display mode of the home screen and providing an instruction to make device registration may be performed with various methods. For example, a user selects display mode setting for the home screen from a setting item screen that is displayed when the user selects the "MENU" 706 on the home screen shown in FIG. 6. The user sets a display mode by operating the displayed screen and selecting the recommend mode from among the plurality of modes including the fixed button mode and the recommend mode.

As the display mode of the home screen is set to the recommend mode, the device registration processing unit 307 transmits an identifier that uniquely identifies the MFP 101, such as a device serial number, to the recommend button management server 102. In device registration, not only an identifier for uniquely identifying a device but also a product name, a shipping destination, or information about the functions of the MFP 101, such as whether a scanner and/or a fax is provided, may be transmitted. The device registration processing unit 502 of the recommend button management server 102 (described later) executes a device registration process based on data received from the MFP 101. When the device registration process is successful, the recommend button management server 102 provides the MFP 101 with a notification that device registration is successful.

The recommend button management server 102 starts generating and transmitting recommend button information to the MFP 101 upon completion of device registration.

The storage unit 310 of the MFP 101 receives, from the recommend button management server 102, the notification that device registration is successful, and stores in device registration information 314 that the device has been registered. The device registration information 314 stores information indicating whether the device has been registered in the recommend button management server 102. The device registration information 314 indicates not registered when device registration has not been made once. The device registration information 314 remains indicating not registered when the storage unit 310 fails to make device registration. Examples of the case where the storage unit 310 fails to make device registration include a case where the storage unit 310 receives a notification that device registration has failed from the recommend button management server 102 during a device registration process and a case where there is no response from the recommend button management server 102 for a predetermined period of time. When the storage unit 310 fails to make device registration, the device registration processing unit 307 may be configured to automatically retry a registration process.

A device registration determination unit 306 determines whether a device registration process in the recommend button management server 102 is complete by checking a device registration status stored in the device registration information 314.

A job log transmission unit 308 transmits job log information stored in the job log table 313 to the recommend button management server 102. For example, a type of a job executed in the MFP 101, setting values when the job is executed, and a job execution user are stored in the job log table 313 in association with a date and time. When a user authentication function of the MFP 101 is enabled, information for identifying a login user is stored as a job execution user. When the user authentication function of the MFP 101 is disabled, information for identifying the MFP 101 is stored as a job execution user. A job log that the job log transmission unit 308 transmits to the recommend button management server 102 is used to generate recommend button information.

A recommend button information acquisition unit 309 communicates with the recommend button management server 102 and acquires recommend button information. When the recommend button information acquisition unit 309 receives recommend button information transmitted from the recommend button management server 102, the recommend button information acquisition unit 309 provides an instruction to the storage unit 310 to store the received recommend button information table in a recommend button information table 312 (described later).

A button enabled state determination unit 305 determines whether a process or a function designated in recommend button information received from the recommend button management server 102 is available in the MFP 101.

A home button generation unit 304 determines button names and button images to be displayed on the home screen based on button information stored in a fixed button information table 311 or the recommend button information table 312. The UI control unit 302 displays, on the operating unit 207, the home screen in which buttons generated by the home button generation unit 304 are arranged according to the order of display of the button information.

The storage unit 310 functions as a storage control unit that executes processes, such as writing data to the ROM 202, the RAM 203, the storage 204, or the like, and reading out data. The storage unit 310 stores designated data in the ROM 202, the RAM 203, or the storage 204 or reads out stored data in accordance with an instruction from another functional unit. In the present embodiment, the storage unit 310 manages the fixed button information table 311, the recommend button information table 312, the job log table 313, and the device registration information 314, stored in the storage 204 of the MFP 101.

Here, the details of the recommend button information table 312 and fixed button information table 311 stored in the MFP 101 will be described with reference to FIG. 10 and FIG. 11.

FIG. 10 is a view showing an example of the recommend button information table 312 stored in the MFP 101. Recommend button information received from the recommend button management server 102 is stored in the recommend button information table 312. Job information indicating each target to be recommended, a job type, and settings of job is stored in the recommend button information table 312. Furthermore, a display priority, a button name, and a file name of a button image are associated with job information and stored in the recommend button information table 312 as recommend button information.

A target to be recommended is information indicating which user each piece of recommend button information is recommended when the user logs in or to which apparatus each piece of recommend button information is recommended. In the present embodiment, when the user authentication function is disabled, the MFP 101 displays recommend buttons by using the recommend button information of which the target to be recommended is the MFP 101.

When the user authentication function is enabled, the MFP 101 displays recommend buttons by using the recommend button information of which the target to be recommended is a login user. For example, when the login user is user001, the MFP 101 displays buttons by using the recommend button information of which the target to be recommended is user001.

A job type is information indicating which job type recommend buttons belong to. Job settings indicate settings of a job that is executed when a user selects a recommend button. A display priority is information for determining the order in which recommend buttons are arranged when displayed on the home screen. "scan" denotes a priority that is used when the MFP 101 is in a scan priority state, for example, where an original is placed on an ADF. "print" denotes a priority that is used when the MFP 101 is in a print priority state, for example, where unprinted data is held.

Job settings are setting values of a job that is executed when the recommend button is selected. Setting values are determined by the recommend button management server 102 based on setting values of a job executed by a user in the past.

A button name and a button image are respectively a name set by the recommend button management server 102 in accordance with a job type and job settings, and a file name indicating a button image. The MFP 101 generates images of buttons to be displayed on the home screen in accordance with button names and button images, and displays the names in a superimposed manner on the images.

Button information that is stored in the recommend button information table 312 of FIG. 10 is set in accordance with execution logs of jobs of each target to be recommended. By displaying the home screen using the table, functions having a higher frequency of use and settings having a higher frequency of use for a target to be recommended are preferentially displayed.

FIG. 11 is a view showing an example of the fixed button information table 311. The fixed button information table 311 is a table that stores information of buttons to be used in the fixed button mode.

The fixed button information table 311 stores a button name to be used and a file name indicating an image of the button to be used when the button is displayed on the home screen, the order of display of the button, and a transition destination screen indicating a screen when the button is selected in association with one another as one button information. A user is able to change the arrangement of buttons in the fixed button mode with a method (not shown). When a user changes the arrangement of buttons, information of the order of display of the fixed button information table 311 is updated. When a user generates a shortcut key for which setting values of a job are registered in advance, information of the shortcut key is registered in the fixed button information table 311.

In the example of FIG. 11, the "COPY" button of which the order of display is first is displayed at the position indicated by 701 in FIG. 6 with the image "home_bt_copy.png". When the copy button is selected, the screen transitions into the "copy setting screen" as shown in FIG. 7.

As shown in FIG. 11, in the fixed button mode, the home screen in which buttons are arranged in arrangement set by a user in advance is displayed. In the fixed button mode, the home screen can be displayed in the same arrangement of buttons even at any time of the time at which the power of the MFP 101 turns on, the time at which a user logs in, and the time at which the home screen is displayed by using the home button (not shown).

Figure 4:
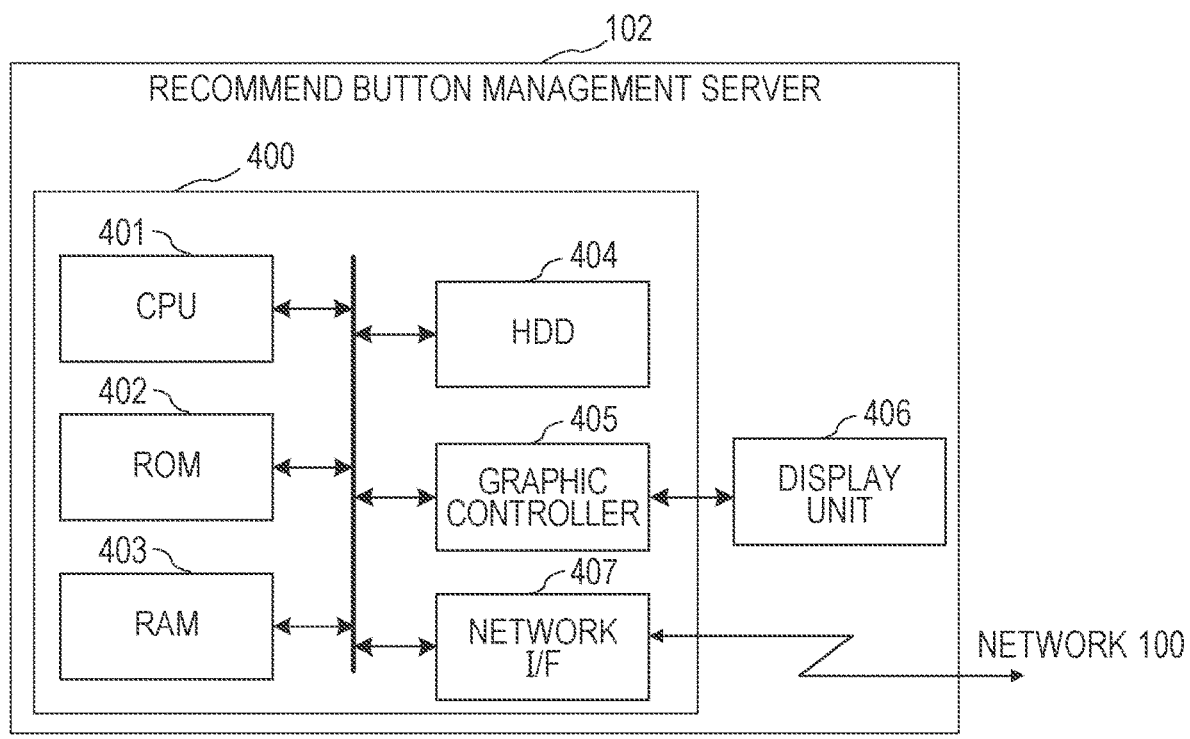
FIG. 4 is a hardware configuration diagram of a recommend button management server.

FIG. 4 is a block diagram showing the hardware configuration of the recommend button management server 102 in the present embodiment. A control unit 400 including a CPU 401 controls the overall operations of the recommend button management server 102. The CPU 401 is made up of an arithmetic circuit, reads out programs stored in ROM 402 or an HDD 404 onto RAM 403 and executes various processes. The ROM 402 stores a system program and the like that are used to control the recommend button management server 102. A graphic controller 405 generates a screen that a display unit 406 is caused to display. The HDD 404 has a function of a storage area and stores an application program and the like that execute various processes. The HDD 404 is an example of a storage device and may be made up of a solid state drive (SSD) other than an HDD. A network I/F 407 is an interface for connecting various devices with the recommend button management server 102. For example, a display, a keyboard, a mouse, or the like can be connected to the recommend button management server 102 via the network I/F 407. The network I/F 407 communicates with the MFP 101 or the like via the network 100 in accordance with control of the CPU 401.

Figure 5:
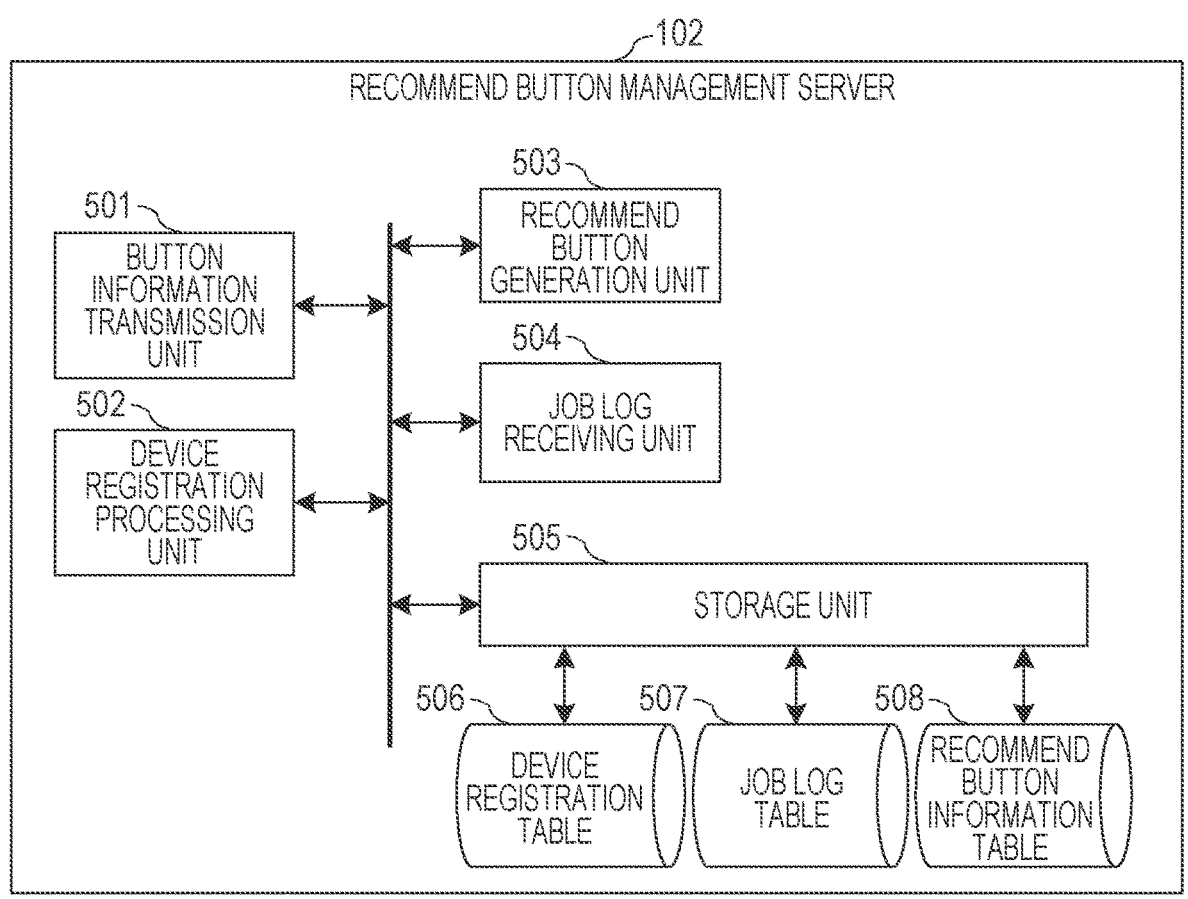
FIG. 5 is a software configuration diagram of the recommend button management server.

FIG. 5 is a software configuration diagram of the recommend button management server 102 in the present embodiment. Functional units shown in FIG. 5 are implemented by the CPU 401 of the recommend button management server 102, executing control programs.

A job log receiving unit 504 receives job log information that is transmitted from the MFP 101 and provides an instruction to a storage unit 505 to store the job log information in association with the identifier of the MFP 101 or the identifier of a login user in the job log table 507. When the MFP 101 is being used with user authentication disabled, the job log receiving unit 504 receives the identifier of the MFP 101, a job type, job settings, and an execution date and time of the job and stores those pieces of information in association with one another in the job log table 507. When the MFP 101 is being used with user authentication enabled, the job log receiving unit 504 receives the identifier of the login user, a job type, job settings, and an execution date and time of the job and stores those pieces of information in association with one another in the job log table 507.

A recommend button generation unit 503 generates recommend button information in accordance with job log information recorded in the job log table 507 at predetermined time, such as when the recommend button generation unit 503 receives job log information from the MFP 101. The time to generate recommend button information is not limited to the above-described time and may generate recommend button information at predetermined intervals, for example, every 24 hours.

Recommend button information contains execution job information that is a combination of a type of a job that is executed when a button is selected and setting values of the job, a display priority of the button, and a target to be recommended. When the recommend button generation unit 503 generates recommend button information, the recommend button generation unit 503 provides an instruction to the storage unit 505 to store the generated recommend button information in the recommend button information table 508.

FIG. 12 is a view showing an example of the recommend button information table 508.

The recommend button information table 508 stores a target to be recommended and execution job information that is a combination of a type of a job and setting values of the job. The recommend button information table 508 stores a priority, a button name, and a button image when the recommend button is displayed on the home screen in association with one another and stores the button information in association with execution job information.

Recommend target information is used at the time of extracting recommend button information to be transmitted to the MFP 101 from the recommend button information table 508. A target to be recommended may be a user like user001 or user002 or may be an image forming apparatus like MFP001. The recommend button management server 102 transmits, to the MFP 101, recommend button information associated with a target to be recommended, provided from the MFP 101 with a notification. In FIG. 12, when user001 is designated as a target to be recommended, a button information transmission unit 501 transmits five pieces of button information storing user001 as the target to be recommended to the MFP 101 as recommend button information.

A type of a job that is executed when an associated button is selected is stored in the job type. In the example of FIG. 12, any one of two "print" and "scan" is stored as large classification. In addition, a detailed job type such as "COPY" and "TRANSMIT BY E-MAIL" is designated as additional job type information.

At least one setting value of a job, which is used when the job is executed, is stored in the job settings. A pair of setting item name and setting value is stored in a job setting value. For example, in the top record in FIG. 12, the number of print copies is one, the color mode is monochrome, a single side/double side print setting is double side, and a page aggregation setting is 2in1. Only setting items that are changed from default settings of the apparatus are stored in job settings.

A display priority is information that is used in arrangement of buttons when the MFP 101 displays the home screen. In the present embodiment, the priority is higher as the numeric value of the display priority reduces. The relationship between a display priority and button arrangement will be described by using the home screen of FIG. 8. The display position of the "ONE MONOCHROME COPY" 902 on page 1 of the recommend button display region 901 is a position at which a button having the highest display priority is arranged. Subsequently, a button having a higher display priority is arranged first in order of the "SCAN TO FIXED DESTINATION" 903 and the "SAVE TO CLOUD STORAGE" 904. Buttons having lower priorities are similarly arranged on page 2 and the following pages.

In the example of the display priority in FIG. 12, the display priority of the button in each of the two job types, that is, scan and print, is stored. The display priority indicated by scan is a display priority that is used when a scan job is highly likely to be input. The display priority indicated by print is a display priority that is used when a print job is highly likely to be input. The case where a scan job is highly likely to be input is, for example, a case where an original is placed in a scanner. The case where a print job is highly likely to be input is, for example, a case where a print job is spooled in the memory of the MFP 101. When it is difficult to determine which job is to be input, using the display priority of any one of scan and print may be determined in advance or the sum of the display priorities of scan and print may be used. Not limited to scan or print, a display priority may be stored for each of other various job types, or only one display priority may be stored regardless of a job type.

A button name is a button name that is used when an associated recommend button is displayed. The recommend button generation unit 503 sets a button name by extracting setting values of specific setting items from job settings. A name that is determined in accordance with job settings from among a plurality of button names determined in advance may be used as a button name.

A button image indicates a file name of a button image that is used when an associated recommend button is displayed on the home screen. The recommend button generation unit 503 sets a button image in accordance with a job type and job settings. A button image is stored in the MFP 101. The recommend button management server 102 sets only a file name of a button image.

The description will be returned to FIG. 5. The button information transmission unit 501 transmits recommend button information in response to a recommend button information request from the MFP 101.

FIG. 13 is a view showing an example of recommend button information that the recommend button management server 102 transmits to the MFP 101.

FIG. 13 shows an example in which recommend button information is transmitted as a Java script (registered trademark) object notation (JSON) file. Other than that, an extensible markup language (XML), or the like, may be used. Not only recommend button information but also an HTML file containing layout information of the home screen or the like may be transmitted.

"name" in the recommend button information to be transmitted denotes the name of a button to be displayed on the home screen of the MFP 101 in accordance with the recommend button information. "type" denotes information corresponding to the job type of the recommend button information table 508 shown in FIG. 12. "icon" denotes information corresponding to the button image of the recommend button information table 508 shown in FIG. 12. "order" denotes information corresponding to the display priority of the recommend button information table 508 shown in FIG. 12. "parameters" denote information corresponding to job setting values. FIG. 13 is recommend button information containing information of two recommend buttons of which the button names are ONE DOUBLE-SIDED MONOCHROME COPY and SCAN TO FIXED DESTINATION. The button information transmission unit 501 transmits recommend button information associated with a target to be recommended, designated in a recommend button information request received from the MFP 101, of the information stored in the recommend button information table 508 shown in FIG. 12.

Referring back to FIG. 5, the device registration processing unit 502 accepts device registration from the MFP 101 and provides an instruction to the storage unit 505 to store the identifier of the MFP 101 and the function information of the MFP 101 in a device registration table 506 in association with each other. When the storing process into the device registration table 506 completes, the device registration processing unit 502 transmits a device registration success notification to the MFP 101. The storage unit 505 stores designated data in the ROM 402, the RAM 403, or the HDD 404 or reads out stored data in accordance with an instruction from another functional unit. In the present embodiment, the storage unit 505 manages the device registration table 506, the job log table 507, and the recommend button information table 508 stored in the HDD 404 of the recommend button management server 102.

Figure 14:
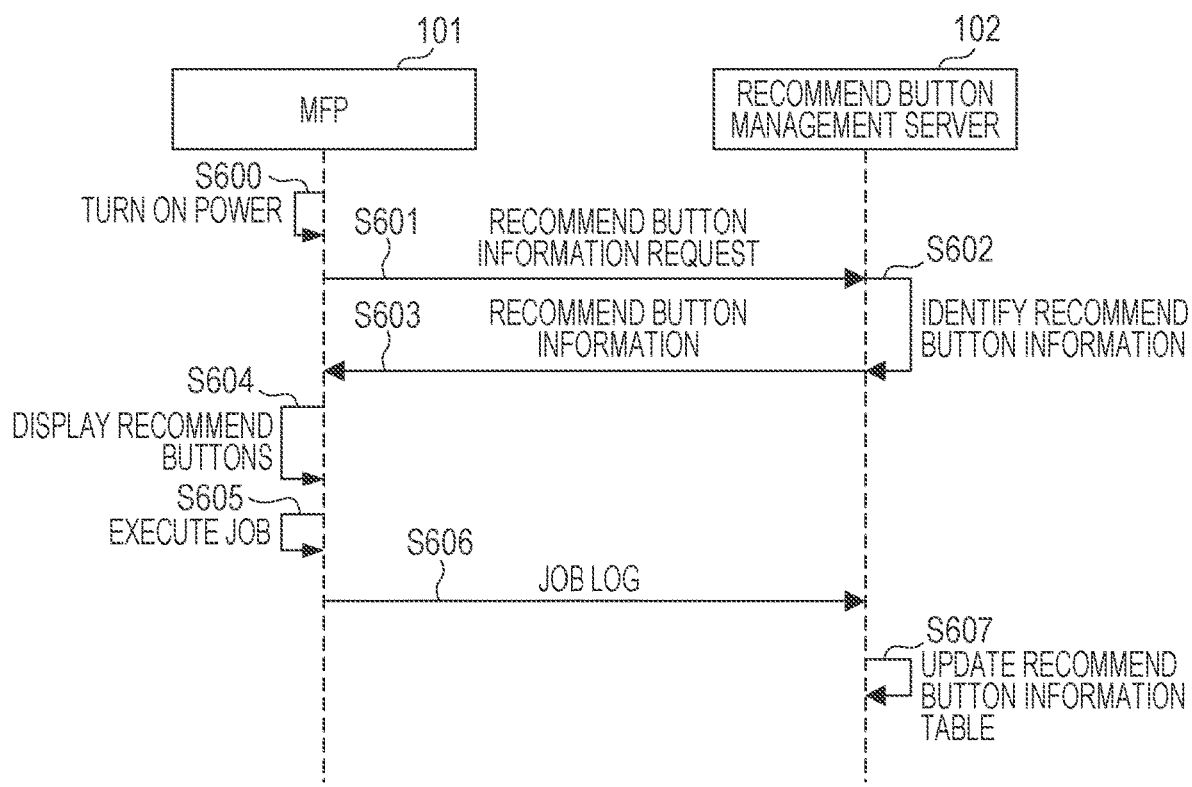
FIG. 14 is a sequence diagram showing an example of a process in which the MFP acquires recommend button information from the recommend button management server and executes a job in the embodiments.

FIG. 14 is a sequence diagram showing a series of processes including acquisition of recommend button information, transmission of job log information, and generation of recommend button information in the present embodiment.

In the present embodiment, it is assumed that buttons to be displayed on the home screen are recommended for each MFP. In addition, it is assumed that, as the MFP 101 starts up, the MFP 101 acquires recommend button information and displays the home screen in accordance with the acquired recommend button information.

The MFP control unit 301 of the MFP 101 executes a process for starting up the MFP 101 as a user turns on the power of the MFP 101 (S600).

The recommend button information acquisition unit 309 of the MFP 101 transmits a recommend button information request to the recommend button management server 102 when the MFP 101 starts up (when the power turns on) (S601). A recommend button information request contains information for identifying a target to be recommended. When buttons to be displayed on the home screen are recommended for each MFP, a recommend button information request contains information for identifying an associated MFP.

The button information transmission unit 501 of the recommend button management server 102 receives recommend target information and extracts recommend button information to be recommended for the target to be recommended from the recommend button information table 508 (S602). The button information transmission unit 501 transmits the identified recommend button information to the MFP 101 (S603).

The recommend button information acquisition unit 309 of the MFP 101 receives the recommend button information from the recommend button management server 102. The recommend button information acquisition unit 309 of the MFP 101 controls the storage unit 310 and stores the received recommend button information in the recommend button information table 312. When the recommend button information of the target to be recommended, designated in S601, is already stored in the recommend button information table 312, the recommend button information acquisition unit 309 executes the following process. The recommend button information acquisition unit 309 updates the information of the recommend button information table 312 with the new recommend button information received in S603.

When recommend buttons are stored, the home button generation unit 304 generates buttons in accordance with the recommend button information and displays the recommend buttons on the home screen (S604). The home button generation unit 304 generates button images in accordance with the names of the buttons and the image information of the buttons, contained in the recommend button information received from the recommend button management server 102. In the present embodiment, it is assumed that the button images are stored in the MFP 101 in advance. The MFP 101 may be configured to acquire button images from the recommend button management server 102.

The UI control unit 302 displays the buttons generated by the home button generation unit 304 on the home screen in the display mode set in the instruction provided by the display mode control unit 303. In the present embodiment, the UI control unit 302 of the MFP 101 generates button images and determines arrangement of buttons on the home screen. Alternatively, the recommend button management server 102 may transmit a hyper text markup language (HTML) file containing information such as the layout of the home screen, the button images, and the arrangement positions of the buttons to the MFP 101. In this case, the UI control unit 302 displays the home screen by using a browser installed in the MFP 101.

The UI control unit 302 accepts a user's selection from among the displayed buttons via the home screen. As the user selects any one of the buttons displayed on the home screen and provides an instruction to execute a job, the MFP control unit 301 executes the job (S605). The UI control unit 302 provides an instruction to the MFP control unit 301 to execute the job using job setting values stored in the recommend button information. After the MFP control unit 301 executes the job, the MFP control unit 301 provides an instruction to the storage unit 310 to store the type of the executed job, the setting values of the job, the job execution user, and an execution date and time in the job log table 313.

The job log transmission unit 308 transmits the job log information stored in the job log table 313 after execution of the job to the recommend button management server 102 in association with the identifier of the MFP 101 (S606).

The job log receiving unit 504 of the recommend button management server 102 receives the job log information from the MFP 101. The job log receiving unit 504 provides an instruction to the storage unit 505 to store the received job log information in the job log table 507. The recommend button generation unit 503 generates recommend button information in accordance with the job logs (S607). In the present embodiment, the recommend button generation unit 503 generates recommend button information in accordance with the job logs stored in the job log table 507. The recommend button generation unit 503 counts the number of jobs executed with the same setting values, of the job logs stored in the job log table 507. The recommend button generation unit 503 classifies each job type into scan or print. The recommend button generation unit 503 assigns the display priority of scan for job information of which the job type is scan in descending order of the number of times job settings are used. After that, the recommend button generation unit 503 assigns the display priority of scan for job information of which the job type is print in descending order of the number of times executed. Furthermore, the recommend button generation unit 503 assigns the display priority of print for job information of which the job type is print in descending order of the number of times executed. After that, the recommend button generation unit 503 assigns the display priority of print for job information of which the job type is scan in descending order of the number of times executed. When the recommend button generation unit 503 generates recommend button information, the recommend button generation unit 503 may be configured not to generate recommend button information of which the number of times executed is less than a predetermined number in the job log table 507 as a recommend button. With this configuration, recommendation of job settings of which the number of times executed is small in the past is prevented. When the recommend button generation unit 503 counts the number of times a job is executed with the same settings, the recommend button generation unit 503 may be configured not to count the one a predetermined period of time or longer before a current date and time. With this configuration, recommendation of job settings executed before but not used currently is reduced.

A method in which the recommend button generation unit 503 generates recommend buttons is not limited to the above-described method. For example, the recommend button generation unit 503 may be configured to arrange job logs stored in the job log table 507 in order of execution date and time and generate recommend button information by assigning a display priority in ascending order of a time to current date and time. Alternatively, the recommend button generation unit 503 may be configured to obtain an accumulating total of the number of times executed in the past for each setting item and generate recommend button information in accordance with the accumulating value.

When the recommend button generation unit 503 generates recommend button information, the recommend button generation unit 503 updates recommend button information by providing an instruction to the storage unit 505 to store the generated recommend button information in the recommend button information table 508.

Here, the example in which buttons to be displayed on the home screen for each MFP are recommended without using user authentication is described. Thus, recommend button information to display buttons optimal for all the users of the MFP 101 is returned in S602. Specifically, the recommend button management server 102 transmits recommend button information to display buttons for executing jobs highly frequently used in the MFP 101 without limiting users. The recommend button management server 102 may be configured to recommend buttons associated with a user at the time when the user logs into the MFP 101. In this case, the MFP 101 transmits the identifier of a login user (such as user ID) to the recommend button management server 102 as a target to be recommended in S601. Thus, optimal buttons for the login user are displayed on the home screen.

Figure 15:
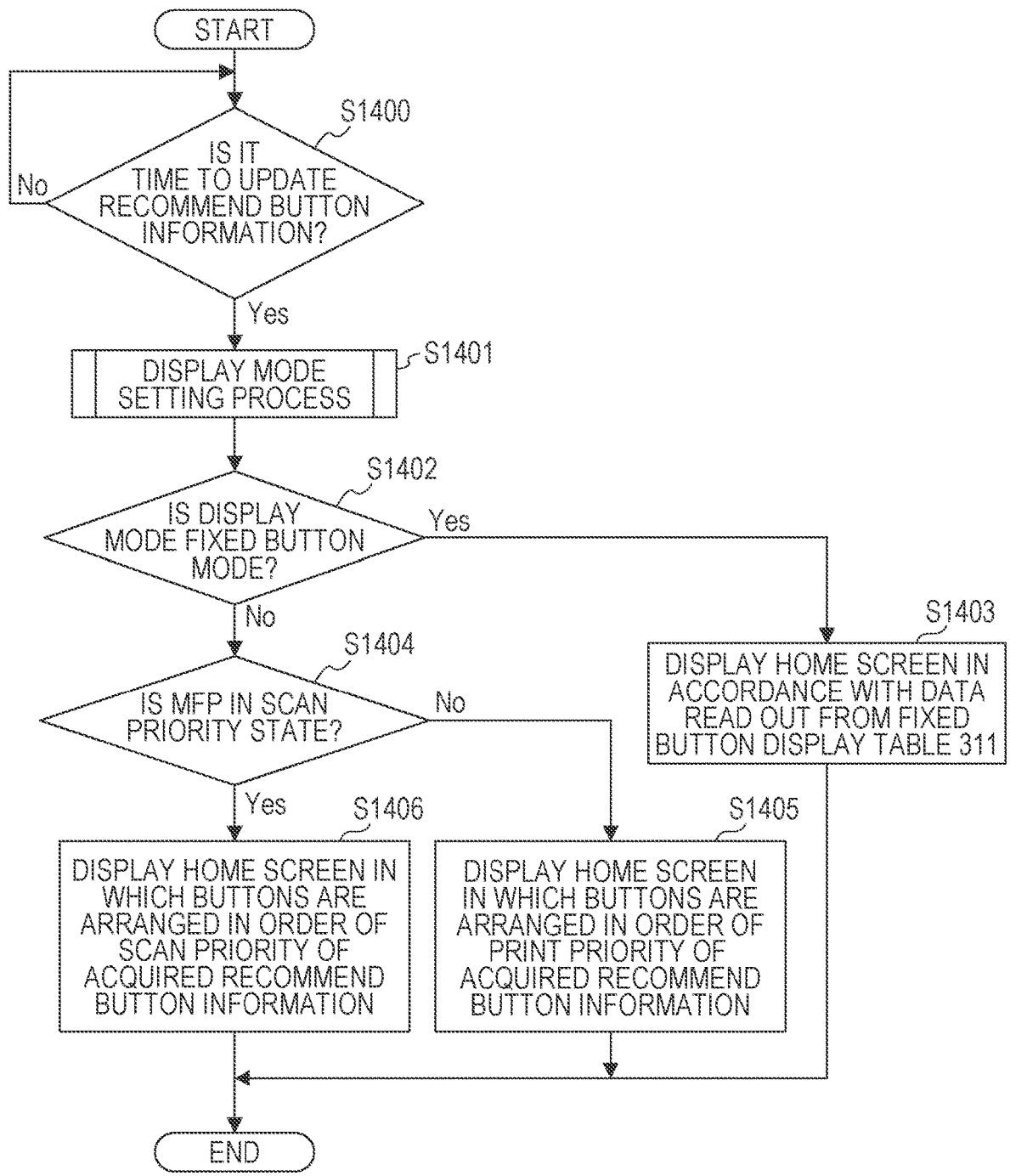
FIG. 15 is a flowchart showing a process of displaying the home screen in a first embodiment.

FIG. 15 is a flowchart showing a home screen display process of the MFP 101. This flowchart is implemented by the CPU 201 operating in accordance with firmware stored in the ROM 202. This also applies to the flowcharts described later. The flowchart of FIG. 15 is executed when the power of the MFP 101 turns on and the home screen is displayed, when a user logs into the MFP 101, or when a user selects the home button (not shown) on the operating unit 207 to provide an instruction to display the home screen. Even in cases other than the above, the CPU 201 executes the process described in FIG. 15 in accordance with an instruction to display the home screen.

The recommend button information acquisition unit 309 acquires recommend button information from the recommend button management server 102 and determines whether it is time to update the recommend button information table 312 (S1400). When it is time to update the recommend button information, the recommend button information acquisition unit 309 proceeds to S1702. When it is not time to update the recommend button information, the recommend button information acquisition unit 309 continues the process described in S1701. Examples of the time to update the recommend button information include, other than the time when the MFP 101 starts up (when the power turns on), the time when a user logs in, the time of a return from a sleep state, and the time when a specific operation, such as placing an original on an original holder into a scanner or an original holder of an ADF, is performed on the MFP 101.

The display mode control unit 303 executes a process of setting the display mode of the home screen (S1401). The details of a mode setting process that is executed in S1401 will be described later with reference to FIG. 16. In the process that is executed in S1401, the display mode control unit 303 sets whether the display mode of the home screen is set to the fixed button mode or the recommend mode.

Subsequently, the display mode control unit 303 determines whether the display mode determined in S1401 is the fixed button mode (S1402). When the determined display mode is the fixed button mode, the UI control unit 302 generates the home screen based on data read out from the fixed button information table 311 and displays the home screen on the operating unit 207 (S1403). In S1403, first, the storage unit 310 reads out the fixed button information table 311. The home button generation unit 304 generates image data of buttons to be displayed on the home screen shown in FIG. 6 in accordance with the read fixed button information table 311. The UI control unit 302 arranges the buttons on the home screen and displays the buttons on the operating unit 207 in accordance with arrangement designated in the fixed button information table 311. Thus, the home screen shown in FIG. 6 is displayed on the operating unit 207.

When it is determined in S1402 that the display mode is not the fixed button mode, the MFP control unit 301 determines whether the MFP 101 is in a scan priority state (S1404). For example, when an original is placed on the original holder of the ADF of the reading unit 209, the MFP control unit 301 determines that the MFP 101 is in the scan priority state. In addition, when an original cover of the MFP 101 is open, the MFP control unit 301 determines that the MFP 101 is in the scan priority state.

When it is determined in S1404 that the MFP 101 is not in the scan priority state, the UI control unit 302 displays the home screen on which buttons generated in accordance with the information stored in the recommend button information table 312 are arranged in descending order of print priority on the operating unit 207 (S1405). In S1405, first, the storage unit 310 reads out, from the recommend button information table 312, the recommend button information acquired from the recommend button management server 102 in S1401. The home button generation unit 304 generates button images in accordance with the read recommend button information. The UI control unit 302 arranges the generated recommend buttons in the home screen shown in FIG. 8 in descending order of print priority and displays the home screen on the operating unit 207.

When it is determined in S1406 that the MFP 101 is in the scan priority state, the UI control unit 302 displays the home screen on which buttons generated in accordance with the information stored in the recommend button information table 312 are arranged in descending order of scan priority on the operating unit 207 (S1406). In S1406, first, the storage unit 310 reads out, from the recommend button information table 312, the recommend button information acquired from the recommend button management server 102 in S1401. The home button generation unit 304 generates button images in accordance with the read recommend button information. The UI control unit 302 arranges the generated recommend buttons in the home screen shown in FIG. 8 in descending order of scan priority and displays the home screen on the operating unit 207.

By executing the process of S1605 or S1606, the home screen in the recommend mode shown in FIG. 8 is displayed. In S1404 of FIG. 15, it is determined whether the status of the MFP 101 is the scan priority state. Alternatively, it may be determined in S1404 whether the status of the MFP 101 is a print priority state, the process of S1406 may be executed when it is determined that the status is the print priority state, and the process described in S1405 may be executed when it is determined that the status is not the print priority state. Alternatively, the order of display may be set from the information stored in the recommend button information table 312 regardless of the status of the MFP 101 without executing the process of S1404.

Figure 16:
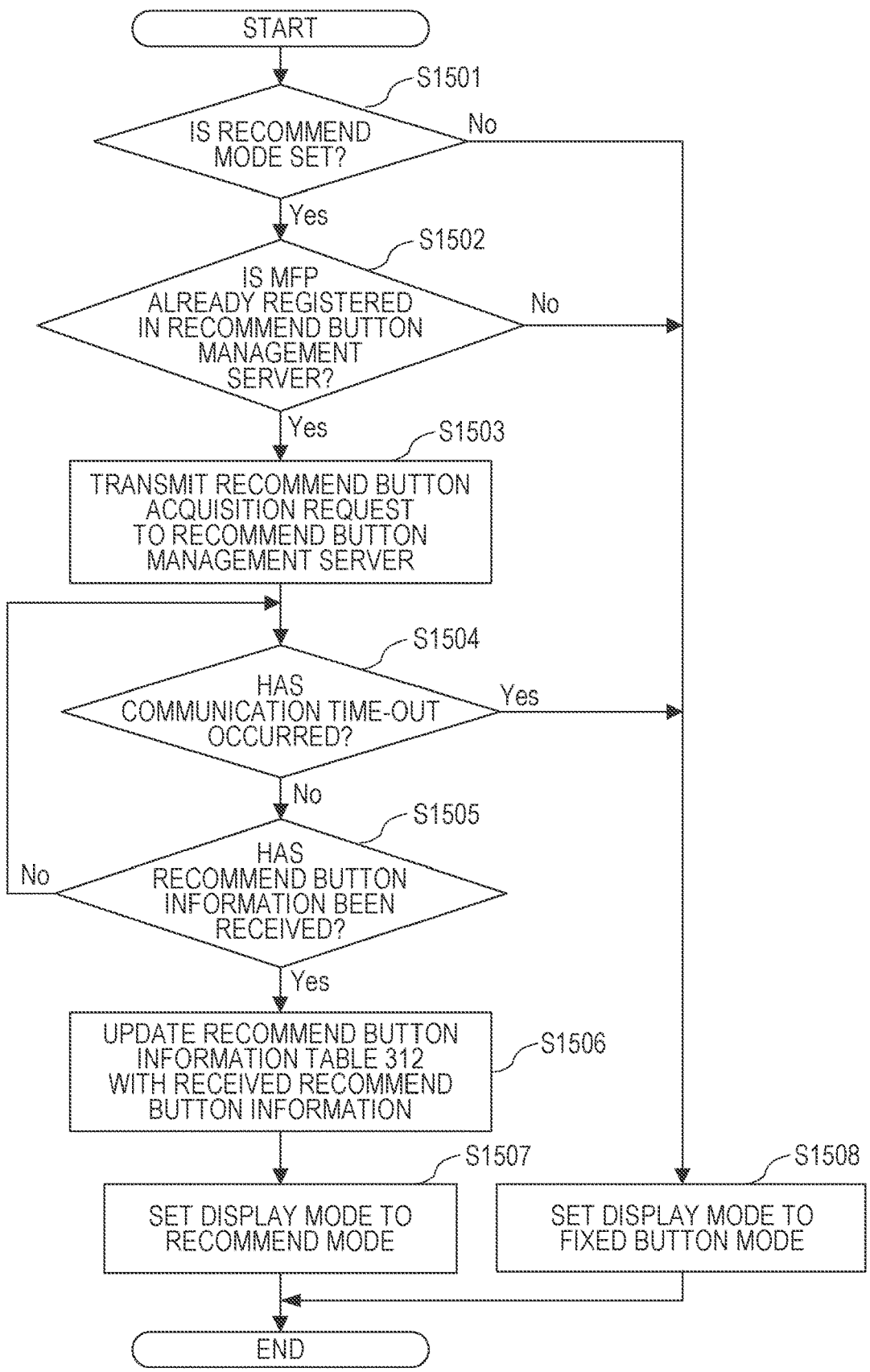
FIG. 16 is a flowchart showing a process of setting a display mode of the home screen in the first embodiment.

FIG. 16 is a flowchart showing the details of the display mode setting process (S1401) in FIG. 15. The process described in FIG. 16 is implemented by the CPU 201 of the MFP 101, operating in accordance with a program and executing the functions of the functional units shown in FIG. 3.

The display mode control unit 303 determines whether the display mode is set to the recommend mode (S1501). In S1501, the display mode control unit 303 determines whether the display mode set by a user is the recommend mode. When the display mode is set to the recommend mode, the process described in S1502 is executed. When the display mode is not the recommend mode, that is, when the display mode is set to the fixed button mode, the process described in S1507 is executed.

Subsequently, the device registration determination unit 306 determines whether the MFP 101 is already registered in the recommend button management server 102 (S1502). The device registration determination unit 306 reads out the device registration information 314 via the storage unit 310 and determines whether the MFP 101 is already registered in the recommend button management server 102. When the MFP 101 is not registered in the recommend button management server 102, the process of S1506 is executed. When it is determined in S1502 that the MFP 101 is not registered in the recommend button management server 102, the UI control unit 302 may display, on the operating unit 207, a notification indicating that the MFP 101 is not registered in the recommend button management server 102.

The recommend button information acquisition unit 309 transmits a recommend button information request to the recommend button management server 102 (S1503). The recommend button information acquisition unit 309 transmits an acquisition request for recommend button information containing information indicating a target to be recommended to the recommend button management server 102. In the case of settings that the MFP 101 does not use the user authentication function, the recommend button information acquisition unit 309 transmits information for identifying the MFP 101, such as the device name, the serial number, or the like of the MFP 101 as a target to be recommended to the recommend button management server 102. In the case of settings that the MFP 101 uses the user authentication function, the recommend button information acquisition unit 309 transmits information for identifying a user, such as the user ID of the user, as a target to be recommended to the recommend button management server 102.

The recommend button information acquisition unit 309 determines whether a time-out of communication with the recommend button management server 102 has occurred (S1504). When no recommend button information is acquired due to a communication error or the like, even after a lapse of a predetermined period of time and, as a result, a time-out of communication with the recommend button management server 102 has occurred, the recommend button information acquisition unit 309 proceeds to S1508. When a time-out of communication with the recommend button management server 102 has occurred in a state where recommend button information is not received from the recommend button management server 102, the UI control unit 302 may display this situation on the operating unit 207. In S1508, after an acquisition request for recommend button information is transmitted, when a time-out of communication with the recommend button management server 102 has occurred in a state where recommend button information has not been acquired, the display mode of the home screen is set to the fixed button mode. Alternatively, when a time-out of communication with the recommend button management server 102 has occurred in S1504, an acquisition request for recommend buttons may be retried a predetermined number of times. When the MFP 101 does not receive recommend button information even after a lapse of a predetermined period of time from when the MFP 101 transmits an acquisition request for recommend button information to the recommend button management server 102, it is determined that a time-out of communication has occurred.

When no time-out of communication with the recommend button management server 102 has occurred, the recommend button information acquisition unit 309 determines whether recommend button information has been received from the recommend button management server 102 (S1505). When recommend button information has not been received, the recommend button information acquisition unit 309 returns to S1504. When recommend button information has been received, the recommend button information acquisition unit 309 proceeds to S1506.

The recommend button information acquisition unit 309 controls the storage unit 310 and updates the recommend button information table 312 with the received recommend button information (S1506). At this time, the storage unit 310 updates the recommend button information of the same target to be recommended as the target to be recommended, designated in the acquired recommend button information and does not update information of the other targets to be recommended.

The display mode control unit 303 determines to display the home screen in the recommend mode according to the set display mode and stores the display mode in the memory (S1507). Thus, a user is able to use the home screen using the recommend button information received from the recommend button management server 102.

The display mode control unit 303 determines that the display mode is set to the fixed button mode and sets the display mode in the memory (S1508). With this configuration, even when recommend button information has not been acquired from the recommend button management server 102, the home screen is quickly displayed.

In FIG. 16, when a time-out of communication with the recommend button management server 102 has occurred while recommend button information is not received from the recommend button management server 102, the home screen is displayed in the fixed button mode. When a notification indicating a communication failure has been received from the recommend button management server 102 in S1504 and S1505, the display mode control unit 303 may be configured to set the display mode of the home screen to the fixed button mode.

Figure 17:
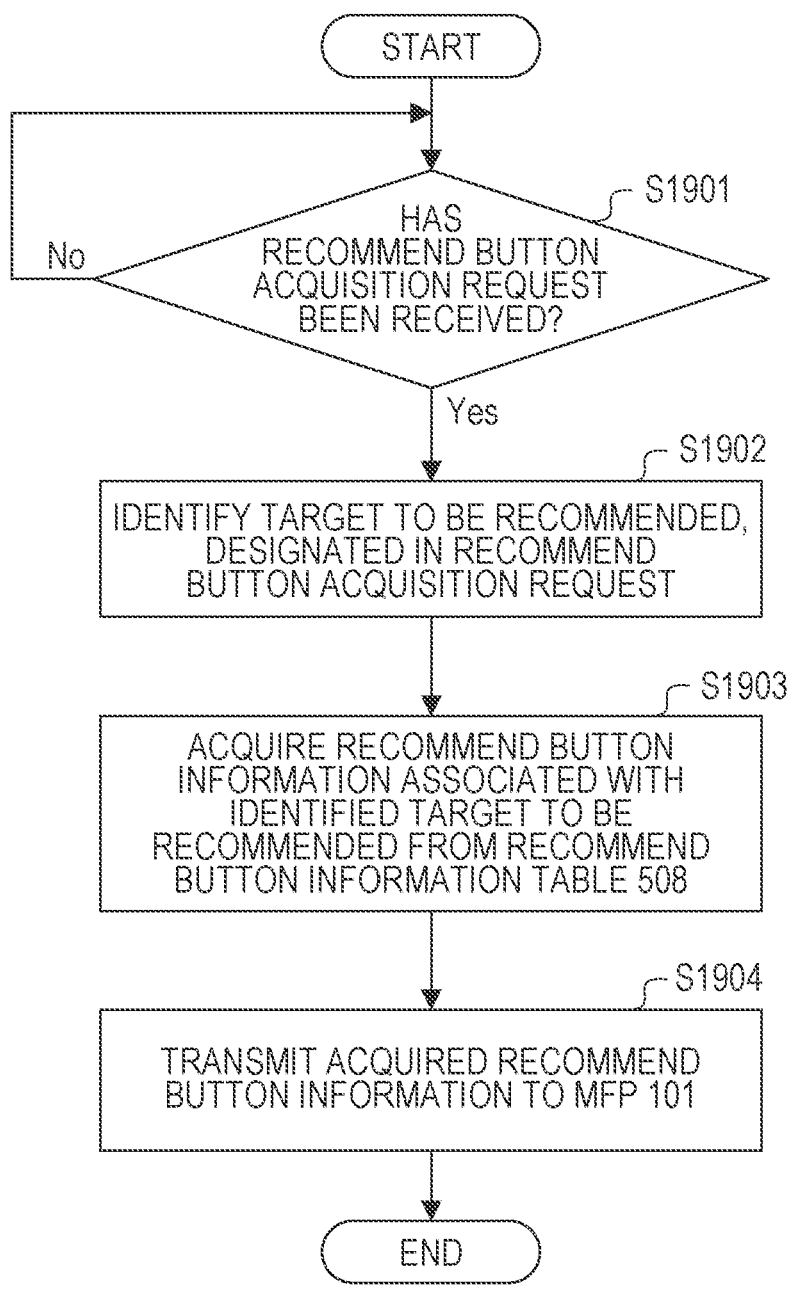
FIG. 17 is a flowchart showing a process that is executed by the recommend button management server upon receiving an acquisition request for the recommend button information in the first embodiment.

A process that is executed when the recommend button management server 102 receives a recommend button acquisition request from the MFP 101 will be described with reference to FIG. 17. The process described in FIG. 17 is started as the power of the recommend button management server 102 turns on. The CPU 401 of the recommend button management server 102 implements the following process by expanding a program stored in the HDD 404 or the ROM 402 onto the RAM 403 and executing the program.

The button information transmission unit 501 determines whether a recommend button acquisition request has been received via a network (S1901). When no recommend button acquisition request has been received, the button information transmission unit 501 repeats S1901. When a recommend button acquisition request has been received, the button information transmission unit 501 proceeds to S1902.

The button information transmission unit 501 identifies the target to be recommended included in the received recommend button acquisition request (S1902).

The button information transmission unit 501 reads out the recommend button information table 508 by controlling the storage unit 505 and acquires recommend button information associated with the target to be recommended, identified in S1902 (S1903).

The button information transmission unit 501 transmits the recommend button information acquired in S1903 to the MFP 101 (S1904). By executing the above-described process, recommend button information is transmitted to the MFP 101.

In the first embodiment, even in a state where acquisition of recommend button information fails because of a communication error or the like, and there are no recommend buttons to be displayed on the home screen, the home screen is quickly displayed by displaying the home screen in the fixed button mode.

Second Embodiment

In the first embodiment, the case where, when the MFP 101 is not capable of updating recommend button information from the recommend button management server 102, the MFP 101 displays a screen using button information stored in advance is described. In a second embodiment, when recommend button information appropriate for the MFP 101 and acquired from the recommend button management server 102 is less than a predetermined number, a screen using button information stored in advance is displayed. This configuration suppresses a situation in which there is a small number of buttons that a user is able to select as a result of a small number of recommend buttons to be displayed.

The configurations shown in FIG. 1 to FIG. 14 are similar to those of the first embodiment, so the description thereof is omitted. In the second embodiment, when the user authentication function is enabled and a user inputs information used for authentication, such as a user ID and a password, to log into the MFP 101, the home screen shown in FIG. 6 or FIG. 8 is displayed. A method for user authentication is not limited to the above-described one and may be any method, such as an IC card, image authentication, and biometric authentication.

Figure 18:
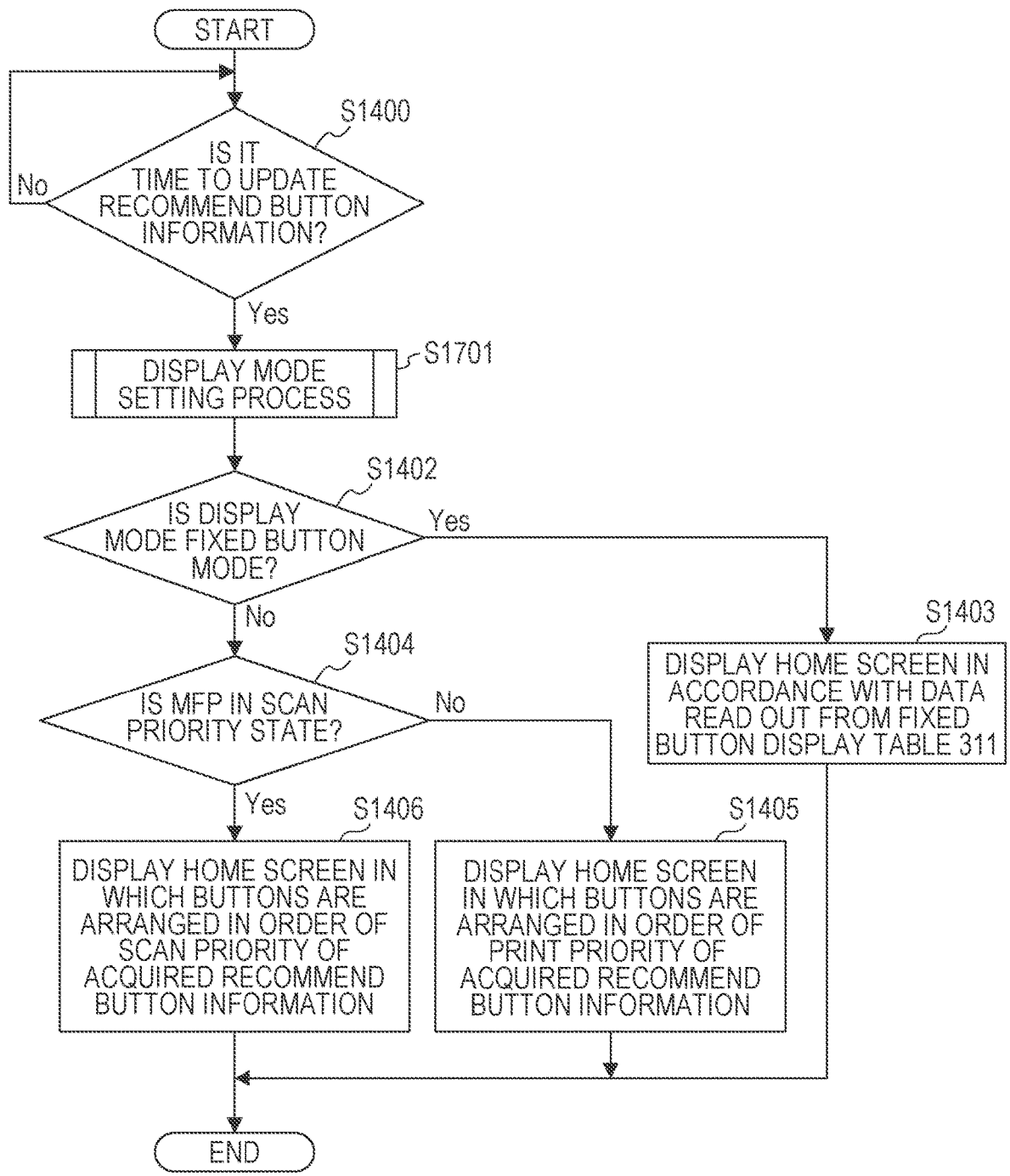
FIG. 18 is a flowchart showing a process of displaying the home screen in a second embodiment.

FIG. 18 is a flowchart showing a process in which the MFP 101 displays the home screen in an appropriate display mode in the second embodiment. FIG. 18 is a process that is executed any time after the power of the MFP 101 is turned on. When a program stored in the ROM 202 or the storage 204 is expanded onto the RAM 203 and the CPU 201 executes the program, the following process is implemented. In FIG. 18, similar signs are assigned to processes similar to those of FIG. 15 of the first embodiment, and the description thereof is omitted.

The display mode control unit 303 executes a process of setting an appropriate display mode (S1701). It is determined through the setting process in S1701 whether to set the display mode of the home screen to the fixed button mode or the recommend mode. The process described in S1701 will be described with reference to FIG. 19.

Figure 19:
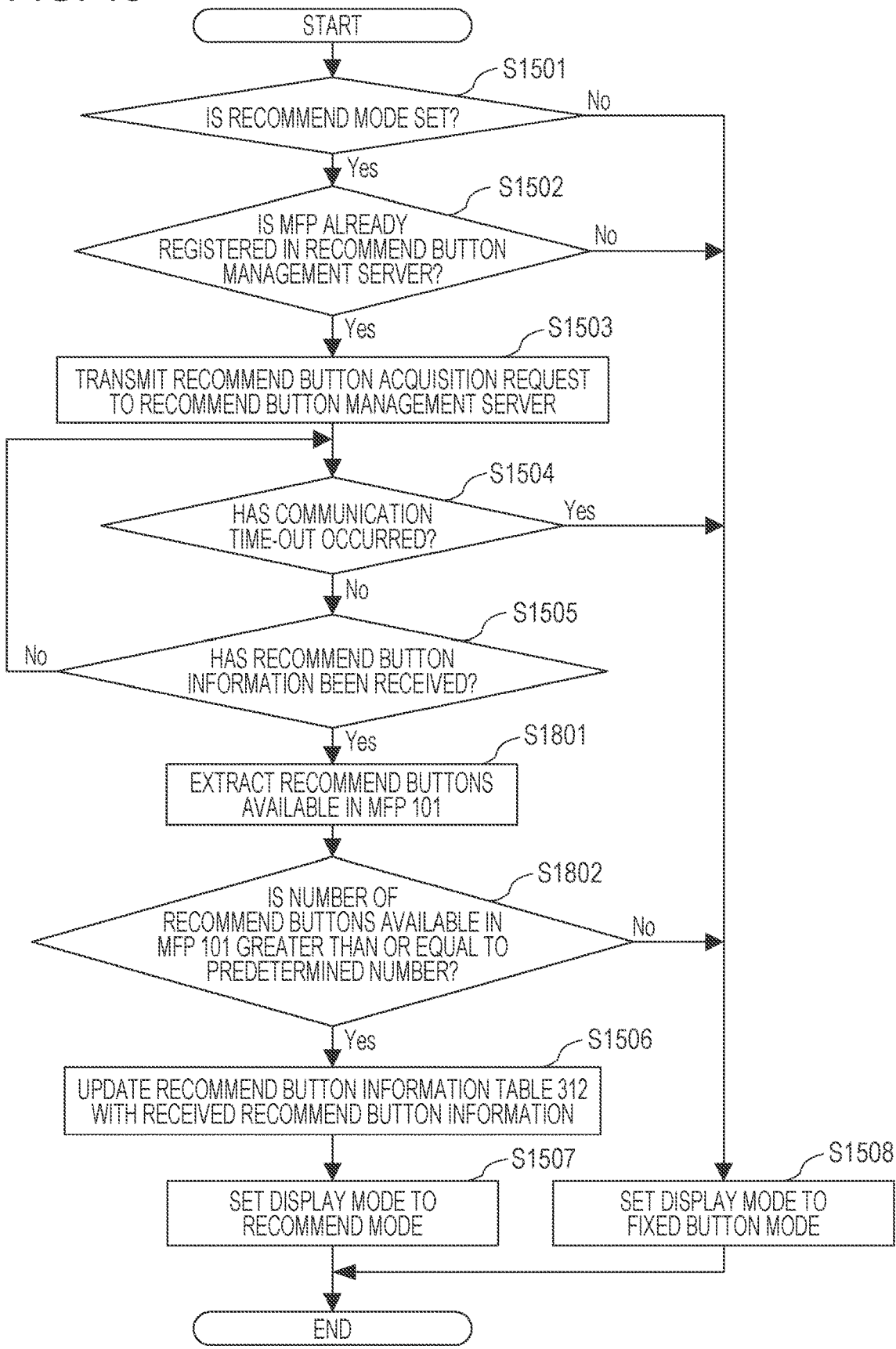
FIG. 19 is a flowchart showing a process of setting a display mode of the home screen in the second embodiment.

FIG. 19 is a flowchart showing a display mode change determination (S1701) in FIG. 18. In FIG. 19, like signs are assigned to the same processes as those of FIG. 16, and the description thereof is omitted. The process described in FIG. 19 is implemented by the CPU 201 executing a program stored in the ROM 202 or the storage 204.

The home button generation unit 304 extracts recommend button information to be displayed on the home screen of the MFP 101 from the recommend button information received from the recommend button management server 102 (S1801). In S1801, the home button generation unit 304 controls the button enabled state determination unit 305. The button enabled state determination unit 305 determines whether each of pieces of recommend button information acquired from the recommend button management server 102 indicates a button having settings available to the MFP 101. For example, it is assumed that, when user001 logs in, a button for executing a fax job is contained in recommend button information received from the recommend button management server 102. However, there can be cases where the MFP 101 has no fax function and is not capable of faxing. In this case, even when the button based on the recommend button information of the fax job, received from the recommend button management server 102, is displayed on the home screen, a user is notable to execute the job by selecting the button. Therefore, in accordance with the hardware configuration of the MFP 101 and function limitation information set for a login user in advance, unavailable recommend button information is excluded from the received recommend button information in S1504. With this configuration, recommend buttons not available to the MFP 101 are not displayed on the home screen of the MFP 101.

The home button generation unit 304 determines whether the number of recommend buttons that can be displayed on the home screen is greater than or equal to a predetermined number (S1802). When the number of recommend buttons that can be displayed on the home screen is greater than or equal to the predetermined number, the home button generation unit 304 proceeds to S1505. When the number of recommend buttons that can be displayed on the home screen is less than the predetermined number, the home button generation unit 304 proceeds to S1507. When the number of recommend buttons that can be displayed on the home screen is less than or equal to the predetermined number, functions that a user intends to use may not be displayed on the home screen. Therefore, when it is determined in S1802 that the number of recommend buttons that can be displayed on the home screen is less than the predetermined number, the display mode of the home screen is changed to the fixed button mode. With this configuration, when the number of buttons that can be recommended for a user is small, a reduction in the number of buttons to be displayed on the home screen is prevented.

The second embodiment makes it possible to efficiently acquire latest recommend button information by acquiring recommend button information at appropriate timing. In a situation in which recommend buttons that can be displayed on the home screen are small and user convenience is highly likely to be impaired, the convenience is improved by using the fixed button mode. Thus, even in a situation in which sufficient job logs are not accumulated in the job log table 507 of the recommend button management server 102, a reduction in the number of buttons to be displayed is suppressed by displaying the home screen in the fixed button mode.

Other Embodiments

In the first embodiment, when recommend button information has not been acquired from the recommend button management server 102, the home screen is displayed in the fixed button mode. When recommend button information has not been acquired from the recommend button management server 102, recommend buttons may be displayed by using recommend button information stored in the recommend button information table 312. In other words, when recommend button information is not updated, the home screen may be displayed by using recommend button information received last time from the recommend button management server 102. In this case, in FIG. 16, the recommend button information acquisition unit 309 executes the process described in S1504, then skips S1505, and executes S1506. Thus, even when recommend button information has not been acquired from the recommend button management server 102, buttons are displayed in accordance with information that has been stored in the recommend button information table 312 before a recommend button acquisition request is transmitted.

In the first embodiment and the second embodiment, the screen of the fixed button mode shown in FIG. 6 cannot be temporarily used in a state where the recommend mode shown in FIG. 8 is displayed. Therefore, a home screen switch button (not shown) may be displayed on the home screen in the recommend mode shown in FIG. 8. When a user selects the home screen switch button, the home screen of the fixed button mode shown in FIG. 6 is temporarily displayed. With this configuration, when the button of a function that a user who has been using the recommend mode intends to use is not displayed on the home screen of the recommend mode, the function can be selected from the home screen of the fixed button mode of FIG. 6. At this time, when the user selects "COPY" 701 on the home screen shown in FIG. 6, the copy screen shown in FIG. 7 is displayed, and the home screen of the recommend mode shown in FIG. 8 is displayed when the home screen is displayed again.

In the first and second embodiments, the recommend button management server 102 sets button names and button images in the recommend mode. The recommend button management server 102 may be configured to set a target to be recommended, a job type, job settings, and a display priority, and the MFP 101 may be configured to set button names and button images in accordance with information received from the recommend button management server 102.

In the first and second embodiments, the time when recommend button information is acquired from the server in the recommend mode is the time when the power of the MFP 101 turns on, the time when a user logs in, the time when the original cover is opened, or the time when an original is placed on the ADF. A user may be allowed to select the time to acquire recommend button information from among a plurality of times including the above times. For example, recommend button information may be acquired only at the time when the power turns on or the time when a user logs in, and recommend button information may not be acquired at the other times.

In the first and second embodiments, information of buttons to be displayed on the home screen is received from the recommend button management server 102. The above-described embodiments may be applied when another screen, such as a screen for setting a job to be displayed on the operating unit 207 of the MFP 101, is displayed by using information acquired from the server. For example, a screen may be configured to be displayed by using information acquired from the server when a screen for setting a job, shown in FIG. 7, is displayed, and the above-described embodiments may be applied.

In the first and second embodiments, recommend buttons that are displayed in the recommend mode are buttons of which the job type and the job settings are associated with one another. When a user selects any one of the buttons, a job can be executed with job settings associated with the selected button without user's setting operation. The same buttons as the buttons displayed on the home screen shown in FIG. 6 may be configured to be displayed in the recommend mode shown in FIG. 9. At this time, the recommend button management server 102 sets display priorities of buttons to be displayed on the home screen of FIG. 6 in accordance with the usage logs of the MFP 101. For example, the priority of "COPY" 701 is raised for MFPs or users of which the number of times a copy job is executed is large, and the priority of "SCAN" 702 is raised for MFPs or users of which the number of times a scan job is executed is large. With this configuration, buttons for which no setting values of a job are set can also be displayed in descending order of priority in the recommend mode.

The present disclosure is implemented by executing the following process. That is, the process is a process in which software (program) that implements the functions of the above-described embodiments is supplied to a system or device via a network or various storage media and a computer (CPU, MPU, or the like) of the system or device reads and executes a program code. In this case, the computer program and a storage medium storing the computer program constitute the present disclosure.

The image forming apparatus described in the embodiments of the present application improves, in an image processing apparatus that displays information of an image to be displayed on an operating unit by receiving the information from a server, user's convenience in the case where the information of the image to be displayed is not received from the server is improved.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-124613, filed Jul. 3, 2019, which is hereby incorporated by reference herein in its entirety.

What is claimed is:

1. An image processing system comprising:
an information processing apparatus; and
an image processing apparatus communicable with the information processing apparatus, wherein
the information processing apparatus includes a controller including a processor, the controller configured to
store first information of a plurality of first buttons to be arranged in a screen to be displayed on a display of the image processing apparatus, and first arrangement of the plurality of first buttons,
receive an acquisition request for the information of the plurality of first buttons from the image processing apparatus, and
in accordance with the acquisition request, transmit the first information of the plurality of first buttons and the first arrangement of the plurality of first buttons to the image processing apparatus,
wherein the image processing apparatus includes a controller including a processor, the controller configured to
store second information of a plurality of second buttons to be displayed on the screen and second arrangement of the plurality of second buttons,
transmit the acquisition request to the information processing apparatus,
receive the first information of the plurality of first buttons and the first arrangement of the plurality of first buttons transmitted from the information processing apparatus, wherein the first arrangement is changed based on a use frequency of the plurality of first buttons,
store the first information of the plurality of first buttons and the first arrangement of the plurality of first buttons received, and
display buttons in accordance with the first information of the plurality of first buttons and the first arrangement of the plurality of first buttons, and
in a case where an error occurs in the receiving, the first information of the plurality of first buttons and the first arrangement of the plurality of first buttons based on the acquisition request transmitted by the image processing apparatus, display buttons based on the second information of the plurality of second buttons and the second arrangement of the plurality of second buttons that are stored in the image processing apparatus, wherein the second arrangement is predetermined regardless of the use frequency,
wherein the image processing apparatus is capable of executing a plurality of functions,
after any one of the plurality of functions is executed, transmit one or more setting values of the executed function to the information processing apparatus,
the information processing apparatus is configured to receive the one or more setting values transmitted by the image processing apparatus, and
the information processing apparatus is configured to, based on the one or more setting values received, update at least one of the first information of the plurality of first buttons and the first arrangement of the plurality of first buttons to be transmitted in accordance with the acquisition request.

2. The image processing system according to claim 1, wherein the error occurs based on time-out of a communication with the information processing apparatus.

3. The image processing system according to claim 1, wherein the second information of the plurality of second buttons is common among users who use the image processing apparatus.

4. The image processing system according to claim 1, wherein the acquisition request is transmitted with a user identifier that logs into the transmitted information is corresponding to the received user identifier.

* * * * *